United States Patent
Kawakami et al.

[11] Patent Number: 5,990,967
[45] Date of Patent: Nov. 23, 1999

[54] TRANSMISSION APPARATUS AND RECEIVING APPARATUS

[75] Inventors: Yasunori Kawakami, Ehime-ken; Hiroyuki Iitsuka, Osaka-fu; Hidetoshi Takeda, Osaka-fu, all of Japan

[73] Assignee: Matsushita Electric Industrial Co., Ltd., Osaka, Japan

[21] Appl. No.: 08/582,281

[22] Filed: Jan. 3, 1996

[30] Foreign Application Priority Data

Jan. 9, 1995 [JP] Japan ................................ 7-018580

[51] Int. Cl.$^6$ .................. H04N 5/04; H04N 5/60; H04N 9/475; H04N 9/32
[52] U.S. Cl. .................. 348/500; 348/512; 348/515; 348/516; 348/518
[58] Field of Search .............. 348/500, 512, 348/515, 516, 518, 519, 520, 536, 914, 513, 514, 497, 498, 499, 505, 537, 425, 845.2; H04N 5/04, 5/60, 9/475, 9/32

[56] References Cited

U.S. PATENT DOCUMENTS

| | | | |
|---|---|---|---|
| 3,629,506 | 12/1971 | Brun | 348/518 |
| 3,962,634 | 6/1976 | Russo | 348/518 |
| 4,084,181 | 4/1978 | Mita | 348/512 |
| 4,703,355 | 10/1987 | Cooper | 348/518 |
| 5,287,182 | 2/1994 | Haskell et al. . | |
| 5,351,090 | 9/1994 | Nakamura | 348/484 |
| 5,410,360 | 4/1995 | Montgomery | 348/536 |
| 5,418,573 | 5/1995 | Basile | 348/512 |
| 5,467,139 | 11/1995 | Lankford | 348/512 |
| 5,535,208 | 7/1996 | Kawakami | 370/84 |
| 5,570,372 | 10/1996 | Shaffer | 370/108 |
| 5,646,941 | 7/1997 | Nishimura | 370/389 |
| 5,781,599 | 7/1998 | Shiga . | |
| 5,818,539 | 10/1998 | Naimpally | 348/465 |
| 5,835,493 | 11/1998 | Magee | 348/467 |

FOREIGN PATENT DOCUMENTS

| 0577329 | 1/1994 | European Pat. Off. . |
| 0703713 | 3/1996 | European Pat. Off. . |

OTHER PUBLICATIONS

"Optimized Data Time Stamps For Digital Audio AMD Video On A Stochastic Network", IBM Technical Disclosure Bulletin, vol. 36, No. 9A, Sep. 1, 1993, p. 183 XP000395356.

Bursky D: "Chip Set Simplifies High–speed Interconnects"; The First IC's to realize the P1394 Serial–Bus Standard Let Designers Build Serial Connections Running At 100 To 400 Mbits/s, Electronic Design, vol. 42, No. 5, 7, Mar. 1994, pp. 114–117, XP000441329.

Teener M: A Bus On A Diet—The Serial Bus Alternative; An Interoduction To The P1394 High Performance Serial Bus, Intellectual Leverage, San Francisco, Feb. 24–28, 1992, no. Conf. 37, Feb. 24, 1992, pp. 316–321, XP000340753, Institute of Electrical And Electronics Engineers.

High Speed Serial Bus Protocol ("High Performance Serial Bus"), referred to as IEEE P1394.

P1394 Standard for a High Performance Serial Bus, P1394 Draft 8.0v2, Jul. 7, 1995, The Institute of Electrical and Electronic Engineers, Inc. (IEEE).

*Primary Examiner*—John K. Peng
*Assistant Examiner*—Wesner Sajous
*Attorney, Agent, or Firm*—Greenblum & Bernstein, P.L.C.

[57] ABSTRACT

The transmitting device latches the time of the absolute clock when the V-sync signal of the video signal block is transmitted, adds to the latched time a predetermined delay time equivalent to the sum of the time required for the transmitting device to process the video signal block and the time required for the transmittance; and transmits the resulting sum value together with the video signal block. The receiver extracts the sum value and produces the V-sync signal delayed by said predetermined delay time.

15 Claims, 17 Drawing Sheets

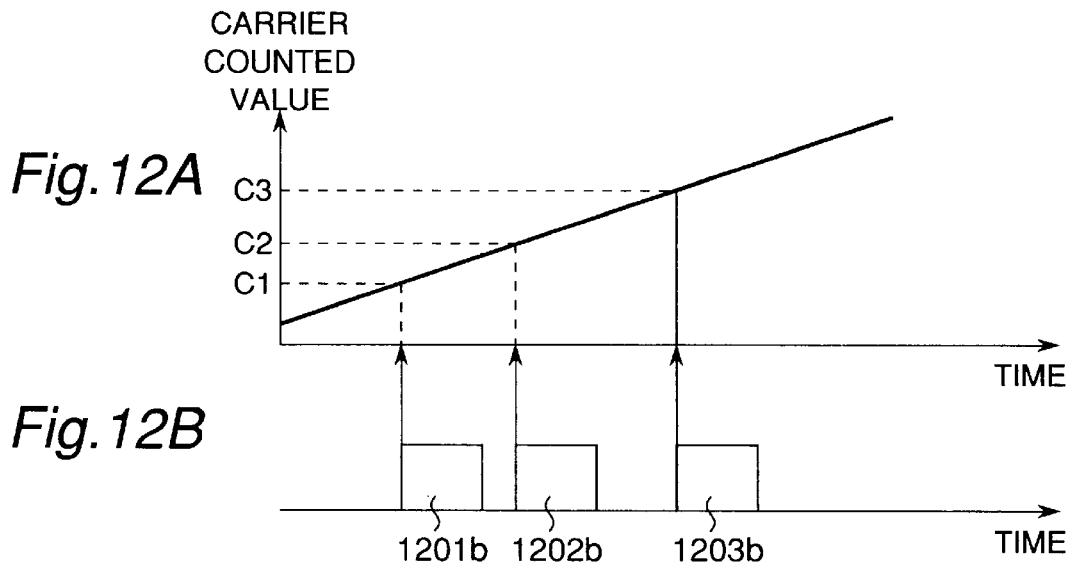
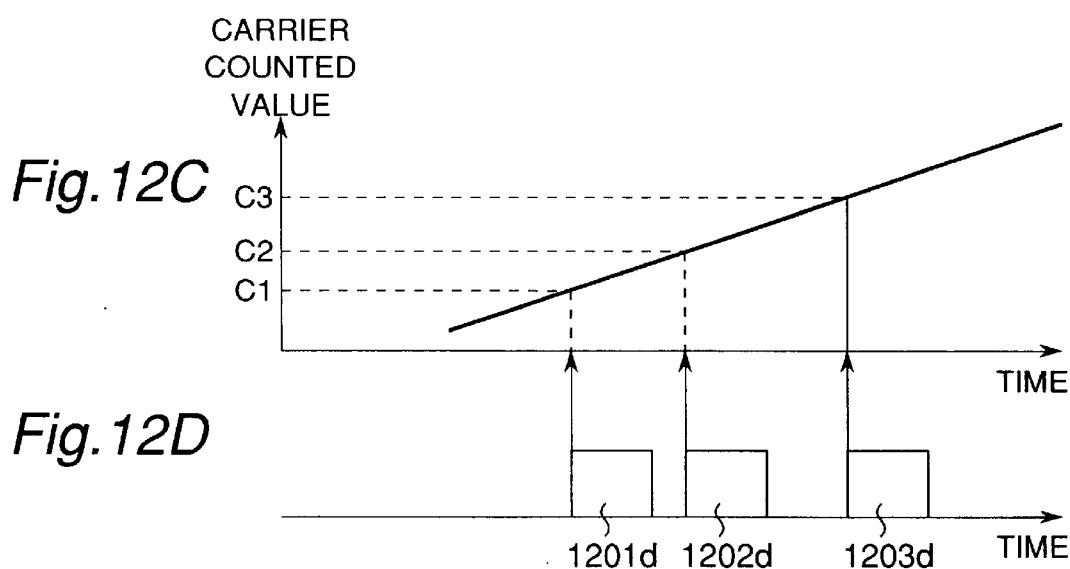

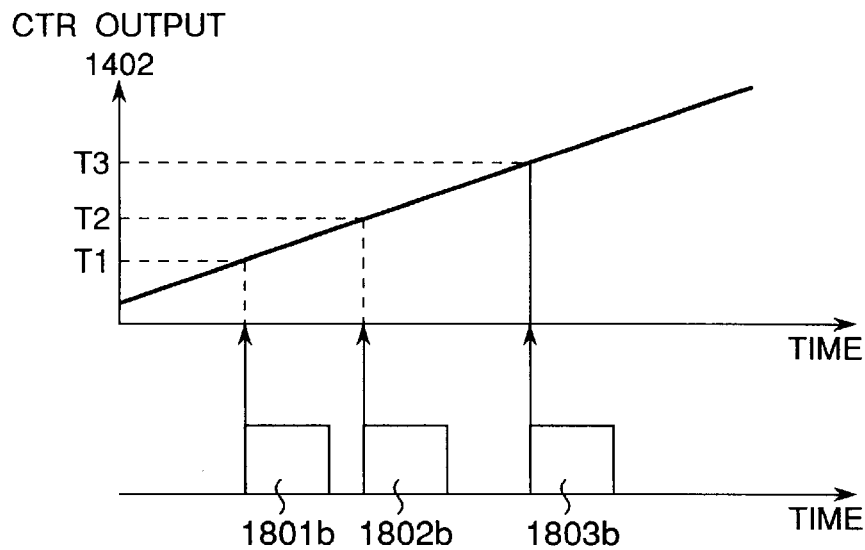
Fig.18A
Fig.18B
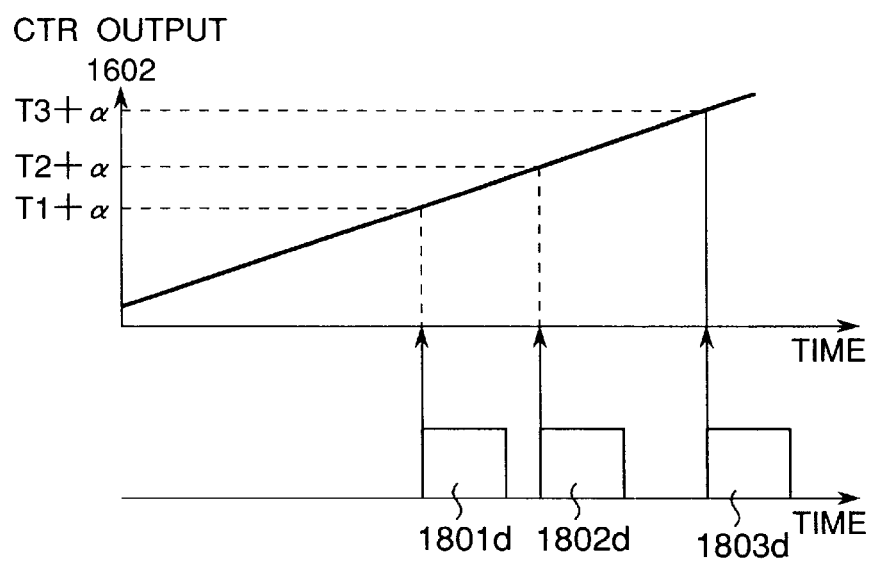
Fig.18C
Fig.18D

TRANSMISSION APPARATUS AND RECEIVING APPARATUS

BACKGROUND OF THE INVENTION

1. Field of the Invention

The present invention relates to a transmission apparatus for transmitting digital audio and video signals for application in, for example, digital VCRs that record and reproduce the audio and video signals as digital signals.

2. Description of the Prior Art

Digital VCRs for recording digital audio and video signals to tape are currently being developed as a means of achieving high image and sound quality. Recording digital video signals, however, greatly increases tape consumption because of the extremely large amount of information the digital video signal carries. As a result, tape consumption is reduced in consumer digital VCRs by compressing the video signal before recording. Intra-frame video signal compression, whereby compression is completed within each frame, is used so that the tape can be edited frame by frame.

This intra-frame compression method compresses the video signal so that the compressed data quantity of each frame is the same in each frame. The rotary head is therefore controlled to record the data to tape synchronized to the frame cycle of the video signal. As a result, when a signal is dubbed between plural digital VCRs, the recording-side VCR must synchronize rotation of the rotary head to the frame cycle of the video signal output by the reproducing-side VCR. The reproducing-side VCR must therefore transmit the video signal frame information to the recording-side VCR.

The intra-frame compression method described above was developed for VCRs because compression must be completed within each frame to enable the user to edit the video signal on a per-frame basis. This method also enables both compression and decompression processes to be executed by the VCR using relatively small-scale circuitry. At the same time, however, compression methods intended for broadcasting applications, and not for the convenience of VCR recording/reproducing, are also being developed.

Broadcasting systems only need to sequentially output the compressed signals, and do not need to allow for inserting different data to the signal stream as do digital VCRs enabling editing by the end-user. It is therefore not necessary for broadcasting system compression schemes to complete compression within each video frame. The compression circuitry can also be relatively large because the compression process is only executed at the broadcasting station. Compression schemes used by broadcasting stations can therefore be relatively complex operations spanning plural frames as a means of also reducing the bandwidth of the broadcast signal. The decompression process, however, must still be executed by a consumer device, and the decompression circuitry must therefore be as small as possible. A protocol known as MPEG2 is thus being developed as a video and audio compression method suited to broadcasting applications.

Under the MPEG2 protocol, the video signal in particular is compressed in blocks of plural video frames, and the data quantity of the input video signal varies from frame to frame. Each frame of the compressed video signal in this method is either a frame (I-frame) in which compression is completed within one frame (intra-coded frames), or a frame containing only the difference data between two or more frames (predictive coded frames (P-frames) or bi-directionally predictive coded frames (B-frames)). Because the I-frames are intra-frame compression coded, the compression rate cannot be increased, and the data quantity after compression is significantly greater when compared with B-frames and P-frames. In addition, because the B-frames and P-frames contain only the data describing the difference between that frame and the adjacent frame(s) or the I-frame, the data quantity after compression is very small.

Thus, the data quantity of the video data compressed according to the MPEG2 protocol will vary from frame to frame. The compressed frames are then stored to MPEG2 transport packets having a constant packet length (size) for transmission or recording/reproducing. Each transport packet also contains a packet identifier (PID) used to discriminate whether the data stored to that transport packet is video data or audio data. When the data rate is low, dummy data is written to a transport packet, and a dummy transport packet is transmitted.

It is also possible to multiplex plural programs for transmission using a single transmission channel because the data rate of the MPEG2-compressed audio/video data is extremely low compared with the original data rate. Even in multiplexed transmissions, however, it is possible to determine to which program the audio/video data in each transport packet belongs by reading the PID contained in each transport packet.

Each transport packet is then input to a transport packet decoder, and the transport packet decoder selects and stores to a buffer memory the transport packets storing the audio/video data for the program to be reproduced. Note that timing information is also added to each transport packet. This timing information is generated on the transmission side based on a 27-MHz clock (the decode clock), and added to the transport packets.

The decode clock is generated on the receiver side based on the timing information added to a known position in each transport packet. The receiving apparatus comprises a 27-MHz oscillator and a counter for counting 27 MHz, detects the difference between the received timing information and the counter value of the receiver-side 27-MHz counter when a transport packet containing timing information is received, and changes the oscillation frequency of the receiver-side 27-MHz oscillator to minimize this difference. Therefore, to correctly reconstruct the decode clock on the receiver side, the timing at which each transport packet is received from the transmission medium must match the timing at which the transport packet was generated by the transmission apparatus. The compressed audio/video data is then decompressed at this reconstructed decode clock by the receiving apparatus to reconstruct an analog signal.

Digital VCRs and devices for recording or broadcasting audio/video data compressed according to MPEG protocols are currently available. Transmission apparatuses for transmitting video and audio data are now needed to enable digital signal dubbing between two digital VCRs, or to receive and record MPEG2-compressed audio/video data to a digital VCR.

The Institute of Electrical and Electronic Engineers, Inc. (IEEE) is currently considering a next-generation high speed serial bus protocol, IEEE P1394 (see "High Performance Serial Bus"). It is possible by means of the IEEE P1394 protocol to transmit isochronous communications data, i.e., real-time data such as video and audio signal data, by isochronous communications using synchronization packets. P1394 enables constant data rate communications by always sending/receiving one isochronous packet every cycle (which is approximately 125 μsec). The clock and cycle period used by the P1394 protocol have no synchronization relationship to the signal source clock. The data transmitted each cycle using the P1394 protocol is one isochronous packet, which can be transmitted at any particular timing within the cycle. The timing at which a packet is transmitted within the cycle is determined each cycle at the convenience of the P1394 bus (i.e., based on P1394 bus activity).

When transmitting audio/video data compressed by the intra-frame compression scheme used in digital VCRs, frame synchronization between the transmitting and receiving sides is necessary. The clock of the P1394 bus used as the transmission medium, however, has no synchronization relationship to the transmitted video signal frame cycle. In addition, the audio/video data is divided among plural transport packets for transmission, but the timing at which each packet is transmitted is determined at the convenience of the P1394 bus. It is therefore not possible, when transmitting intra-frame compression coded data using the P1394 bus, to obtain correct frame synchronization between the transmitting and receiving sides.

Furthermore, when MPEG2 data is transmitted using a transmission medium, such as the P1394 bus, whereby data is transmitted based on a transmission clock or cycle with no synchronization relationship to the signal source, it is not possible for the receiving apparatus to receive the transport packets at the same timing as the transport packets were output by the transmission-side signal source. As a result, the 27-MHz decode clock cannot be correctly reconstructed by the receiving apparatus.

SUMMARY OF THE INVENTION

The first object of the present invention is therefore to newly propose the method described below as a means for resolving the problems described above.

To achieve this object, a transmission apparatus according to the first system of the present invention comprises a signal source for outputting video data, audio data, and added data; a timing information generating means for generating the timing information; a holding means for holding the timing information at a known period synchronized to the video signal; an adding means for adding a predetermined value to the timing information held by the holding means; and a transmission means for transmitting the sum value obtained by the adding means together with the video and audio data.

A receiving apparatus according to the first system of the present invention comprises a receiving means for receiving the video data, audio data, added data, and received timing information; a timing information generating means for generating the timing information; a first reference signal generating means for generating a first reference signal using the received timing information or the timing information generated by the receiver-side timing information generating means; a second reference signal generating means for generating a second reference signal, said second reference signal being a signal of a known frequency; and a phase error detection means for detecting the phase error between said first and second reference signals.

The transmission apparatus according to the first embodiment of the invention adds a particular value to the timing information identifying the video signal frame cycle, and transmits the resulting sum with the audio/video data. This particular value is a value equivalent to the maximum transmission delay time, i.e., the actual time between input and output of the audio/video data to and from the transmission apparatus.

The receiving apparatus compares the received timing information with the clock time data generated by the timing information generating means of the receiving apparatus, and generates a first reference signal. The receiving apparatus also generates a second reference signal of a known cycle, e.g., the frame cycle of the video signal, detects the phase error between the first and second reference signals, and adjusts the frequency of the second reference signal to minimize the phase error. The first and second reference signals are therefore synchronized, and as a result, the receiving apparatus can be synchronized to the frame cycle of the transmission-side video signal.

The second object of the present invention is to newly propose the method described below as a means for resolving the problems described above.

A transmission apparatus according to the second system of the invention comprises a signal source for outputting packetized video and audio data with at least one type of added data such as text data; a timing information generating means for generating the timing information; a carrier clock generating means for generating the carrier clock; a frequency dividing means for frequency dividing the carrier clock by a particular value; a counting means for counting the carrier clock; a first holding means for holding the timing information obtained by the timing information generating means each period of the frequency-divided carrier clock output from the frequency dividing means; an adding means for adding a predetermined value to the timing information held by the first holding means; a second holding means for holding the current count value of the counting means each time the signal source outputs the first data in a transport packet; and a transmission means for transmitting the sum value obtained by the adding means and the count held by the second holding means together with the corresponding transport packet supplied from the signal source.

A receiving apparatus according to the second system of the invention comprises a receiving means for receiving packetized video data, audio data, or added data, such as text data, with received timing information and a received count; a timing information generating means for generating the timing information; a carrier clock reconstructing means for reconstructing the carrier clock from at least the received timing information and the timing information generated by the receiver-side timing information generating means; a counting means for counting the carrier clock; a storage means for storing the transport packets received by the receiving means; and a control means for controlling the storage means using the received count and the counter value counted by the receiver-side counting means.

The receiving apparatus according to the second system of the invention can reconstruct the carrier clock based on the timing information because the timing information is transmitted at a regular interval. The carrier clock count at the timing at which each transport packet is generated by the transmission-side signal source is also transmitted, the carrier clock reconstructed by the receiving apparatus is counted, and the transport packet is output to the internal circuitry when this receiver-side counter value equals the received count.

The third object of the present invention is to newly propose the method described below as a means for resolving the problems described above.

A transmission apparatus according to the third system of the invention comprises a signal source for outputting packetized video data, audio data, or added data such as text data; a timing information generating means for generating the timing information; a holding means for holding the timing information in the first data of each transport packet obtained from the signal source; an adding means for adding a predetermined value to the timing information held by the holding means; and a transmission means for transmitting the sum value obtained by the adding means with the corresponding transport packet supplied from the signal source.

A receiving apparatus according to the third system of the invention comprises a receiving means for receiving packetized video data, audio data, or added data, such as text data, and received timing information; a timing information generating means for generating the timing information; a storage means for storing the transport packets received by the receiving means; and a control means for controlling the storage means using the received timing information and the timing information generated by the receiver-side timing information generating means.

The transmission apparatus according to this third system of the invention adds a particular value to the timing information at which each transport packet is generated by the transmission-side signal source, and transmits the resulting sum with the corresponding transport packet. When the timing information generated by the timing information generating means of the receiving apparatus becomes equal to the transmitted (received) sum value, the receiving apparatus outputs the corresponding transport packet to the internal circuitry.

BRIEF DESCRIPTION OF THE DRAWINGS

The present invention will become more fully understood from the detailed description given below and the accompanying diagrams wherein:

FIGS. 12A, 12B, 12C and 12D are timing charts used to describe the method of transmitting the timing information for carrier clock synchronization according to the second system of the present invention;

FIGS. 18A, 18B, 18C and 18D are timing charts used to describe the method of transmitting the timing information for reconstructing the transport packet timing according to the third system of the present invention.

DESCRIPTION OF PREFERRED EMBODIMENTS

First System

The present invention relates to a synchronization method used by the transmitting and receiving apparatuses when transmitting isochronous communications data, including video and audio data, using the P1394 protocol currently being considered by the IEEE.

Figure 3:
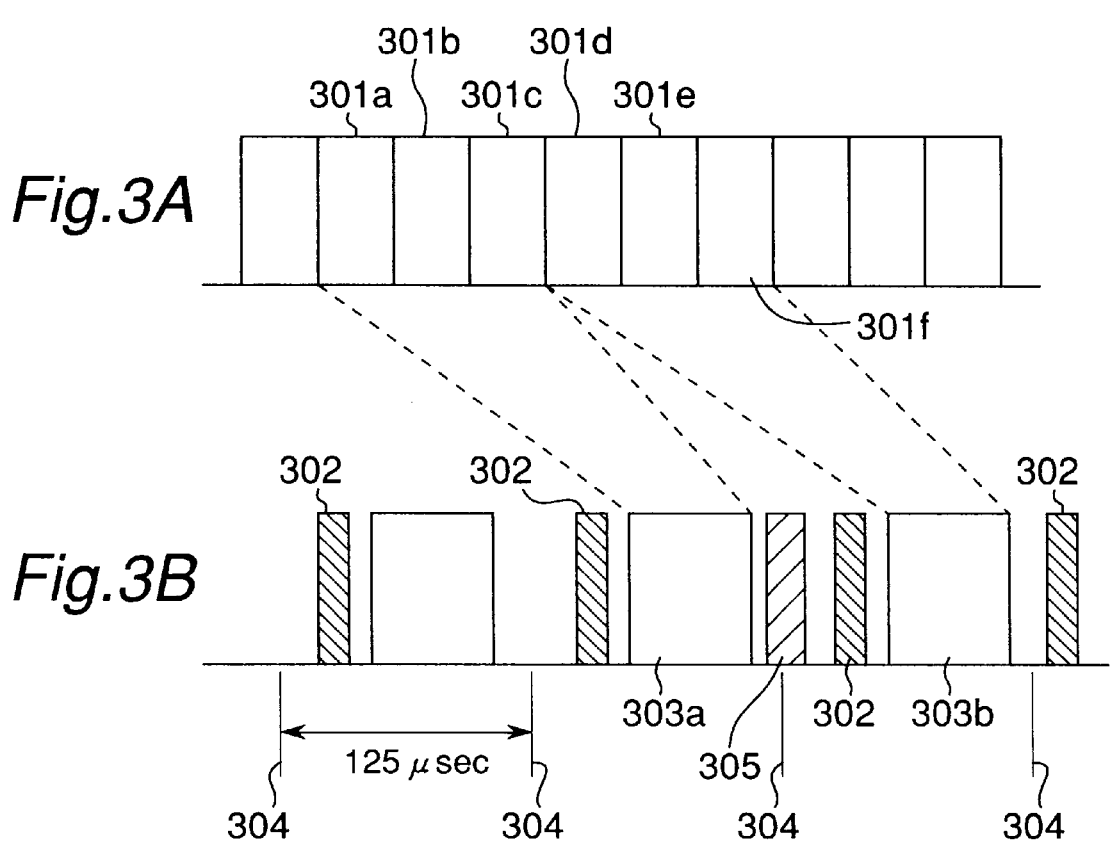
FIGS. 3A and 3B show signal diagrams used to describe the method for transmitting data using the IEEE P1394 bus specification.

The method of transmitting data using the P1394 protocol is used, for example, in an audio/video system component for transmitting data from one node (VCR) to another node (television monitor) which are connected in series through a common bus structure. The data transmission along the bus is described first below with reference to FIG. 3.

Two types of packets may be used under the P1394 protocol: isochronous packets, which are suitable for transmitting audio and video data, and anisochronous packets, which are suitable for transmitting computer data, such as command data for start/stop video recording, CD playing, etc. FIG. 3A shows the compressed audio/video data output from a VCR section of a digital VCR, and FIG. 3B shows the data transmitted over the P1394 bus.

The compressed video and audio data 301a, 301b, 301c, 301d, 301e, and 301f represented in FIG. 3A is output from a digital VCR. To match the operation among the nodes, the P1394 protocol requires all nodes to have a cycle time register ("CTR" below) which is an absolute clock time used among the nodes. The CTR is a 32-bit counter that operates at 24.576 MHz clock. A 125 μsec period is measured by counting from 0 to 3071 using the lowest 12 bits of the CTR. When the lowest 12 bits of the CRT becomes equal to zero, that time point is called a "cycle sync", and a pulse representing the "cycle sync" is produced in a node called "root" which serves as a host node. The "root" looks for data on the bus at each cycle sync 304, and when there is no data on the bus after the cycle sync 304, the root outputs a cycle start packet 302 to the bus.

In the example shown in FIG. 3B, an anisochronous packet (command data) 305 is transmitted at the timing of the cycle sync 304 following isochronous packet 303a. The root waits and outputs cycle start packet 302 after transmission of the anisochronous packet 305 is completed. The period from one cycle start packet 302 to the next cycle start packet 302 is called a "transmission cycle." When the cycle start packet 302 is received by a node, such as a VCR, the audio/video data from the VCR section is assembled in packets containing a predetermined number of data blocks, and the packets are output to the P1394 bus.

In the example shown in FIG. 3B, a predetermined number of data, such as three audio/video data 301a, 301b, and 301c are packetized to one isochronous packet 303a. Similarly, audio/video data 301d, 301e, and 301f are packetized to isochronous packet 303b. Thus, the isochronous packets are output to the P1394 bus. In the example shown in FIG. 3B, only one packet, e.g., packet 303a, is inserted in one transmission cycle, but usually a plurality of packets from different nodes are transmitted.

The node that requests to send out isochronous packets previously preserves a time slot in each cycle in the bus structure. The node that has succeeded in occupying the time slot is permitted to send the isochronous packets in the bus structure. When requests are made by a plurality of nodes at the same time, only a number of nodes are permitted, because only a limited number of time slots can fit in in the 125 μsec cycle period. When a node succeeds in occupying a time slot in the bus structure, that node occupies the time slots in the following cycles until the data transmission terminates.

It is assumed that the data is to be sent from a first node to a second node. When the first node completes packetizing the audio/video data received from its VCR, the first node can send the isochronous packet to the bus structure, only when the cycle sync is not yet produced, in the next cycle. The steps for sending the isochronous packet is as follows.

(a) After receipt of the cycle sync, the root produces a cycle start packet along the P1394 bus, and all the nodes connected to the P1394 bus receives the cycle start packet.

(b) A node that desires to send out an isochronous packet sends out a "request" with necessary time slot length to the root after a predetermined time from the receipt of the cycle start packet. If the requested time slot length is still available in the 125 μsec cycle period, the root returns a "permission" to that node. If not available, a "rejection" is returned. A time between the "request" and its "permission" or "rejection" is less than 1 μsec. Thus, one or more nodes may receive the "permission" during one cycle period.

(c) The node that received the "permission" starts to send the isochronous packet immediately.

(d) The node that received the "rejection" waits for a predetermined time and send the "request" again.

Assuming that there are three isochronous packets X, Y and Z send in one cycle in said order with their occupying time slots being 30 μsec, 50 μsec and 40 μsec, respectively, the node for sending the last isochronous packet Z must wait 80 μsec before it can send the packet Z. In the case where an anisochronous packet is inserted, the node for sending the packet Z must wait a longer period of time. Such a waiting period results in the delay of the packet arriving at the receiver. The maximum of this delay counted from the cycle sync is called the "maximum arbitration delay time".

When the first node is a video device, the first node has a VCR, a packetizing apparatus and a transmission apparatus. The packetizing apparatus packetizes the video data produced from the VCR to an isochronous packet, and the transmission apparatus sends out the isochronous packet to the bus structure in the allocated time slot. Thus, from the time the VCR produced the video data, there are time delays of packetizing time and arbitration delay before the receiver's VCR receives the video data. Thus, the time delay between the transmitter's VCR and the receiver's VCR is a sum of the maximum packetizing delay time (several μsec to several 100 μsec depending on the packetizing circuit) and the maximum arbitration delay time (about 125 μsec). In other words, the data input to the transmission apparatus of a transmitting node may therefore be delayed by a time equal to the sum of the maximum packetizing time plus the maximum arbitration delay time before the data is released to the bus, that is before it is received by the receiving apparatus.

The audio/video data is output from the VCR section synchronized to the video signal frame, but is converted to isochronous packets output to the P1394 bus every transmission cycle (approximately 125 μsec). This 125-μsec cycle is the cycle defined for the P1394 bus, and has no synchronization relationship to the frames of the transmitted video data.

When plural nodes output data, the root device determines the output sequence. As a result, a timing at which a packet is output between one cycle start packet and the next cycle start packet is determined dependent on the convenience of the P1394 bus.

The clock used for transmission over the P1394 bus also has no synchronization relationship to the frame cycle of the transmitted video data. It is therefore not possible using the P1394 bus to synchronize the frames between transmission and receiving sides when transmitting intra-frame compression coded video data and audio data.

The transmission apparatus according to the first system of the present invention is described first below. As shown in the block diagram in FIG. 1, this transmission apparatus comprises a VCR section 101 (signal source), cycle time register (CTR) 103 (a timing information generating means), holding circuit 104 (holding means), adder 105 (adding means), maximum delay time generator 112 (delay time generation means), and transmission circuit 102 (transmission means).

The VCR section 101 outputs the intra-frame compression coded video and audio data 106 to the transmission circuit 102 synchronized to the video signal frame, and outputs the video signal frame synchronization signal, such as V-sync pulse, 107 to the holding circuit 104. Every device (node) connected to the P1394 bus comprises a timing information generator known as a cycle time register (CTR) for generating an absolute time that is common to all the nodes connected to the P1394 bus. The absolute time is updated in all the nodes by a time data carried in the cycle start packet 302. The CTR is a counter for counting a 24.576 MHz clock. In the P1394 bus system, the timing is adjusted so that all devices on the bus show the same CTR value. The CTR 103 is used as this timing information generating means in the present invention.

The CTR value 108 indicative of the absolute time is applied to the holding circuit 104. The holding circuit 104 latches the CTR value 108 in response to each V-sync pulse, i.e., to each frame cycle based on the frame synchronization signal 107. The held timing information 109 indicative of the absolute time at which the V-sync pulse is produced, is then input to the adder 105. The adder 105 adds a maximum transmission delay time 110 generated from the maximum delay time generator 112 to the timing information 109. Thus, the sum 111 carries a future time.

The maximum transmission delay time 110 generated by the maximum delay time generator 112 can be either a CTR value equivalent to the sum of the maximum packetizing time and the maximum arbitration delay time, or a CTR value equivalent to the maximum packetizing time. The sum 111 is then input to the transmission circuit 102, which multiplexes the video and audio data 106 input from the VCR section 101 with the sum 111, converts the multiplexed data to isochronous packets, and outputs the isochronous packets to the P1394 bus.

Figure 4:
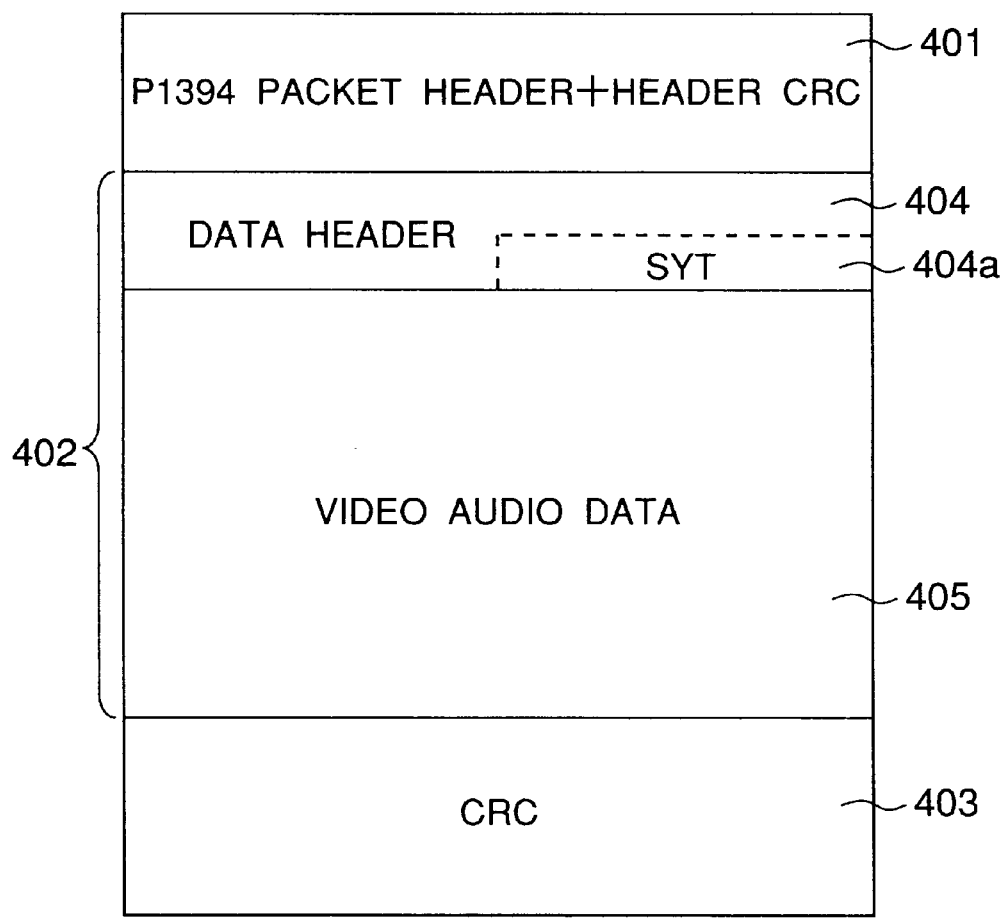
FIG. 4 is a packet diagram used to describe the structure of the isochronous packet output by the transmission apparatus according to the first system of the present invention.

The isochronous packet structure is shown in FIG. 4. Each isochronous packet comprises a header block 401 containing the isochronous packet (P1394) header and header CRC, a data field 402, and a CRC block 403 for the data in the data field. Each data field 402 comprises a data header 404 and the audio/video data block 405. The data header 404 contains information such as the type of data being transmitted, and an SYT field 404a to which the sum 111 is written. The audio/video data block 405 contains the video and audio data 106 input from the VCR section 101.

Figure 1:
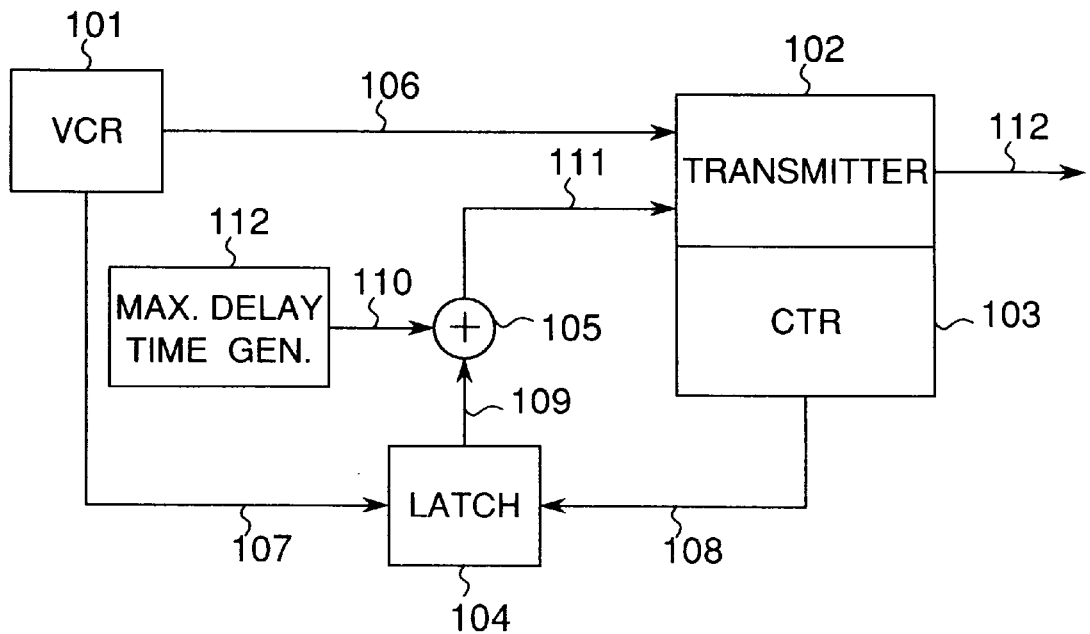
FIG. 1 is a block diagram of a transmission apparatus according to the first system of the present invention.
Figure 2:
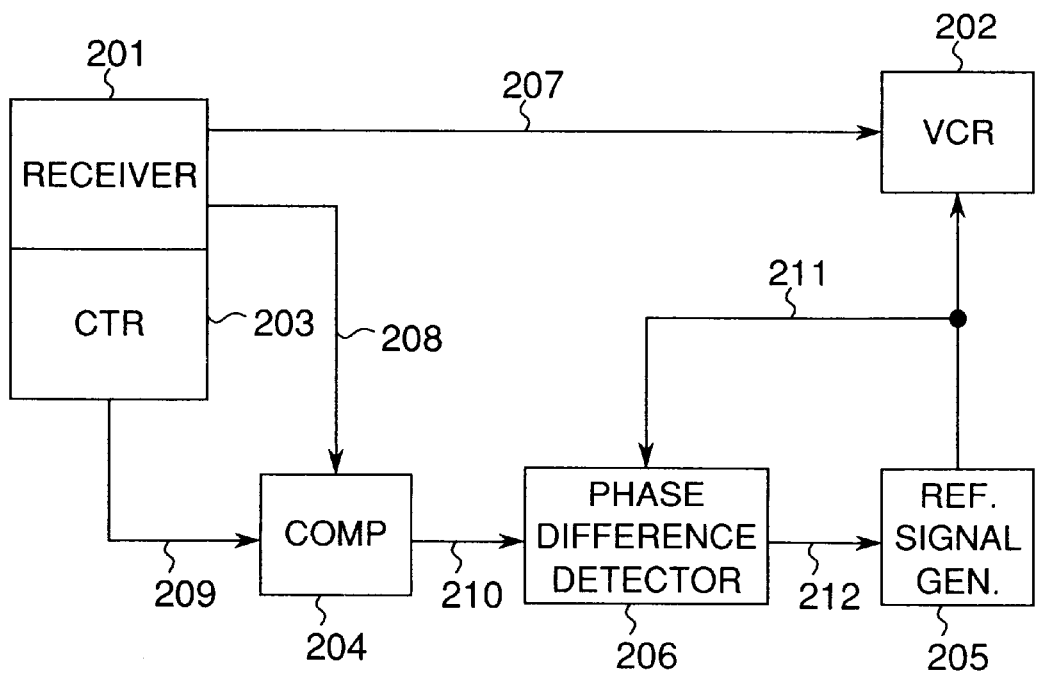
FIG. 2 is a block diagram of the first embodiment of a receiving apparatus according to first system of the present invention.

FIG. 2 is a block diagram of the first embodiment of a receiving apparatus according to the first system of the present invention and compatible with the transmission apparatus of FIG. 1 described above, provided that the maximum transmission delay time 110 fixed in the maximum delay time generator 112 is equivalent to the sum of the maximum packetizing time and the maximum arbitration delay time. The receiving apparatus comprises a receiver circuit 201 (receiving means), cycle time register (CTR) 203 (a timing information generating means), comparator 204 (a first reference signal generating means), a reference signal generator 205 (a second reference signal generating means), and phase error detection circuit 206 (phase error detection means). Note that the receiving apparatus of this system is connected to a VCR section 202 for recording the received audio/video data.

The audio/video data is received by the receiver circuit 201, which outputs the received audio/video data 207 to the VCR section 202. Note that the received audio/video data 207 is the audio/video data written to the audio/video data block 405 of the isochronous packet shown in FIG. 4. The receiver circuit 201 also receives the timing information, and outputs the received timing information 208 (equal to the sum 111) to the comparator 204. Note that the received timing information 208 is the sum value written to the SYT field 404a of the isochronous packet shown in FIG. 4.

As does the transmission apparatus described above, the receiving apparatus of this embodiment uses a CTR for the timing information generating means. The CTR 203 outputs value 209 indicative of the absolute time to the comparator 204. The comparator 204 thus generates a first reference signal 210 at the moment the value 209 from the CTR 203 equals or exceeds the received timing information 208. In other words, comparator 204 produces the first reference signal 210 when the CTR 203 hits the time equal to the sum 111. A positive going pulse is generated from comparator 204 in the present embodiment when the value 209 from the CTR 203 exceeds the received timing information 208.

The reference signal generator 205 generates a frame synchronization signal, such as the V-sync signal, 211. It is noted that the reference signal generator 205 includes a voltage controlled oscillator which produces a signal having the same frequency as the V-sync signal but is not synchronized in the proper phase. The phase is corrected in the following manner. Both the frame synchronization signal 211 and first reference signal 210 are input to the phase error detection circuit 206, which thus outputs the phase error signal 212 to the reference signal generator 205, which thereupon produces the second reference signal, that is, the frame synchronization signal, such as V-sync signal, in a proper phase. The reference signal generator 205 and the phase difference detector 206 serve as a phase locked loop circuit.

The reference signal generator 205 adjusts the frequency of the frame synchronization signal 211 so that the phase error between the first reference signal 210 and the frame synchronization signal 211 is less than the phase error signal 212. In other words, the frame synchronization signal 211 produced from the reference signal generator 205 is synchronized to the first reference signal 210. This effectively synchronizes the frame synchronization signal 211 with the sum 111. In other words, the frame synchronization signal 211 is intentionally delayed by the maximum delay time 110 from the frame synchronization signal 107, i.e., from the synchronization signal of the video signal used on the transmission side. Thus, the fluctuation of the frame synchronization signal 107 appearing in the transmission side due, e.g., to the fluctuation of the speed of the rotary head in VCR 101 also appears in the frame synchronization signal 211 in the receiver size, but after the intentional delay time. Such an intentional delay between the frame synchronization signal 107 of the transmission side and the frame synchronization signal 107 of the receiver side is referred to as a time-difference synchronization.

The VCR section 202 thus controls operation of the rotary head inside the VCR time-difference synchronized to the frame synchronization signal 211 to record the received audio/video data 207 to tape. The frames recorded by the VCR on the receiver side can therefore be time-difference synchronized to the frames of the video data output from the VCR section on the transmission side.

Figure 5A:
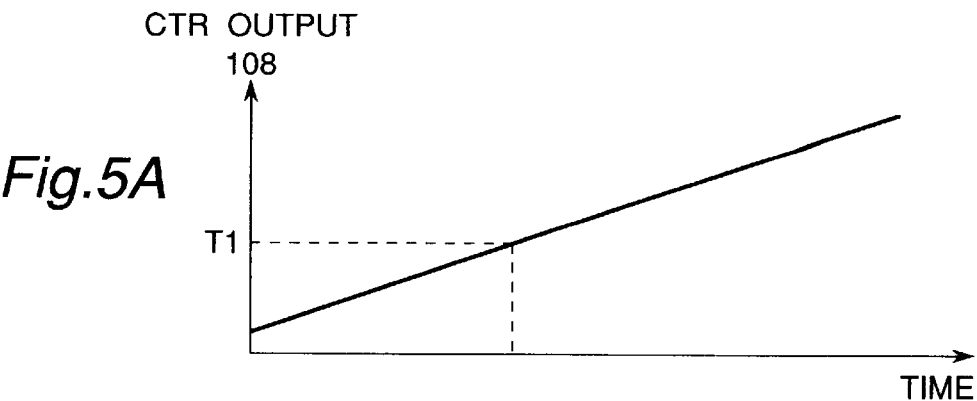
FIGS. 5A, 5B, 5C, 5D and 5E are diagrams showing a method of transmitting the timing information for frame synchronization according to the first system of the present invention.
Figure 5B:
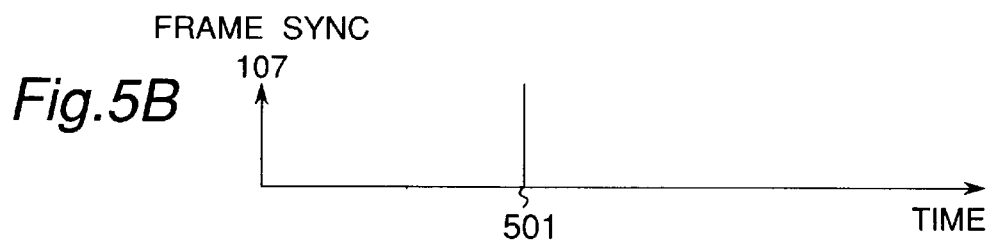
Figure 5C:
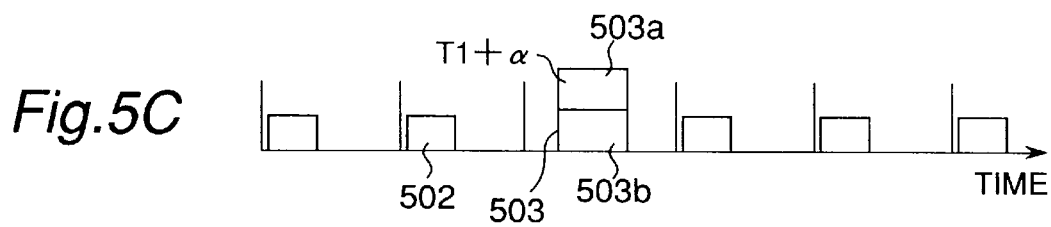

The method of transmitting the frame information of the video signal is described in greater detail below with reference to FIGS. 5A–5E. FIG. 5A shows the change in the value of the CTR 103 on the transmission side, and FIG. 5B shows the frame synchronization signal 107 output from the VCR section 101 on the transmission side. The sum of the maximum transmission delay time α added to T1 supplied from CTR 103 at time 501 when the frame synchronization signal 107 is a positive going pulse is transmitted at a predetermined position in the isochronous packet 503 as shown in FIG. 5C.

The isochronous packet is output to the bus after the output device receives the isochronous packet 502. The timing information 503a, obtained by adding the maximum transmission delay time α to T1 from CTR 103, is written to the data header 404 in the data field of the isochronous packet. The audio/video data 503b is written to the audio/video data block 405 of the data field.

Figure 5D:
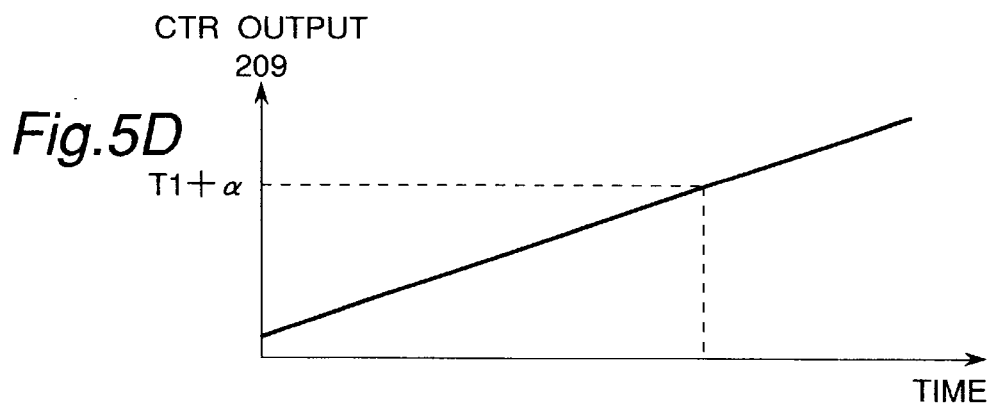

FIG. 5D shows the change in the value of the receiver-side CTR 203. Note that CTR 103 and CTR 203 always indicate the same value in the P1394 bus system. However, because the transmission side transmits the data after adding a value (α in FIG. 5C) equivalent to the maximum transmission delay time between input of data to the transmission apparatus and receiving, the value of the received timing information 503a, i.e., the sum (T1+α) received when the isochronous packet is received by the receiver, is greater than the CTR value generated on the receiver side.

Figure 5E:
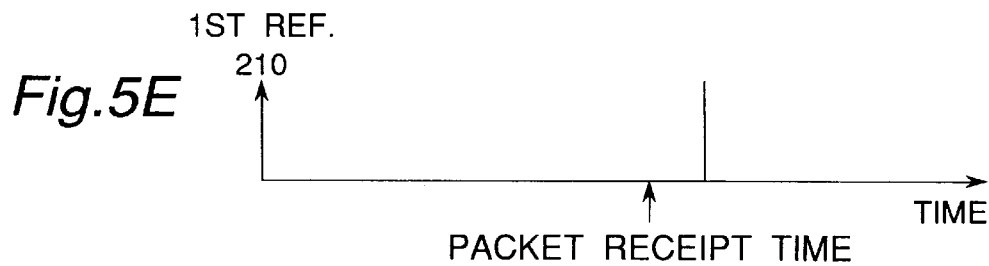

The receiver therefore receives an isochronous packet 503 containing the sum (T1+α), compares this received sum with the value generated by the receiver's CTR 203, and generates a positive going pulse, as shown in FIG. 5E, at a moment when the receiver CTR value exceeds the received sum value. The positive going pulse is the first reference signal 210.

It is therefore possible to obtain correct frame synchronization (i.e., time-difference synchronization) between different digital VCRs by means of the P1394 bus using a clock or transmission cycle having no synchronization relationship to the video signal.

The first reference signal generator in the receiving apparatus described is a comparator 204, and in the first embodiment, the maximum transmission delay time 110 is the sum of the maximum packetizing time and the maximum arbitration delay time.

Figure 6:
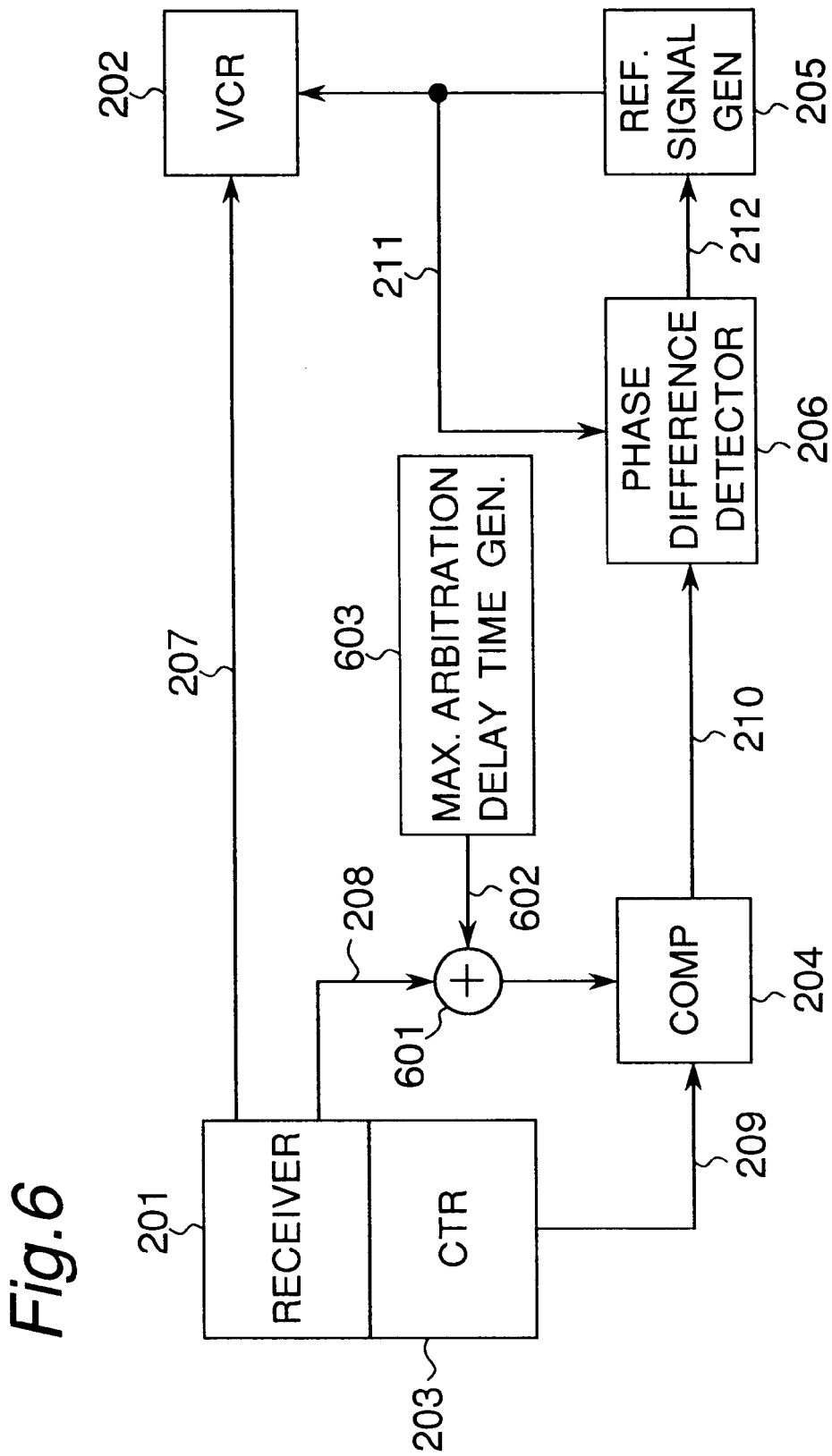
FIG. 6 is a block diagram of a second embodiment of a receiving apparatus according to the first system of the present invention.

A second embodiment of the receiving apparatus according to the present invention is shown in the block diagram in FIG. 6. In the second embodiment, the maximum transmission delay time 110 as generated by the maximum delay time generator 112 is a value of the CTR 103 equivalent to the maximum packetizing time. In this case, depending upon P1394 bus activity, the isochronous packets are delayed at the receiver node, at the maximum, by a time equal to the sum of the maximum packetizing delay time and the maximum arbitration delay time from the cycle sync, but only the delay information of the maximum packetizing delay is carried. In this case, the CTR value of the receiver may already be greater than the received timing information, in which case the first reference signal cannot be generated.

The second embodiment of a receiving apparatus shown in FIG. 6 differs from the first embodiment shown in FIG. 2 in further comprising an adder 601 and a maximum arbitration delay time generator 603. When the maximum transmission delay time 110 is a CTR 103 value equivalent to the maximum packetizing time, the value of the CTR 203 when the received timing information is the sum (T1+α) is a value smaller than the value of the received timing information. The adder 601 therefore adds a value 602 of CTR 203 equivalent to the maximum arbitration delay time, as produced from the maximum arbitration delay time generator 603. The comparator 204 then compares the resulting sum with the value supplied from the CTR 203 to generate a first reference signal whereby video signal frame synchronization between the transmission and receiving sides can be obtained.

It is therefore possible to obtain correct frame synchronization (time-difference synchronization) between different digital VCRs by means of the P1394 bus using a clock or transmission cycle having no synchronization relationship to the video signal.

In the first system described above, the delay time caused by the maximum packetizing time and the maximum arbitration delay time is compensated, but in the second and third systems of the present invention described below, the delay time caused by joining continuously the transport packets or blocks that were spaced by calibrated distances from each other, is compensated.

Figure 7:
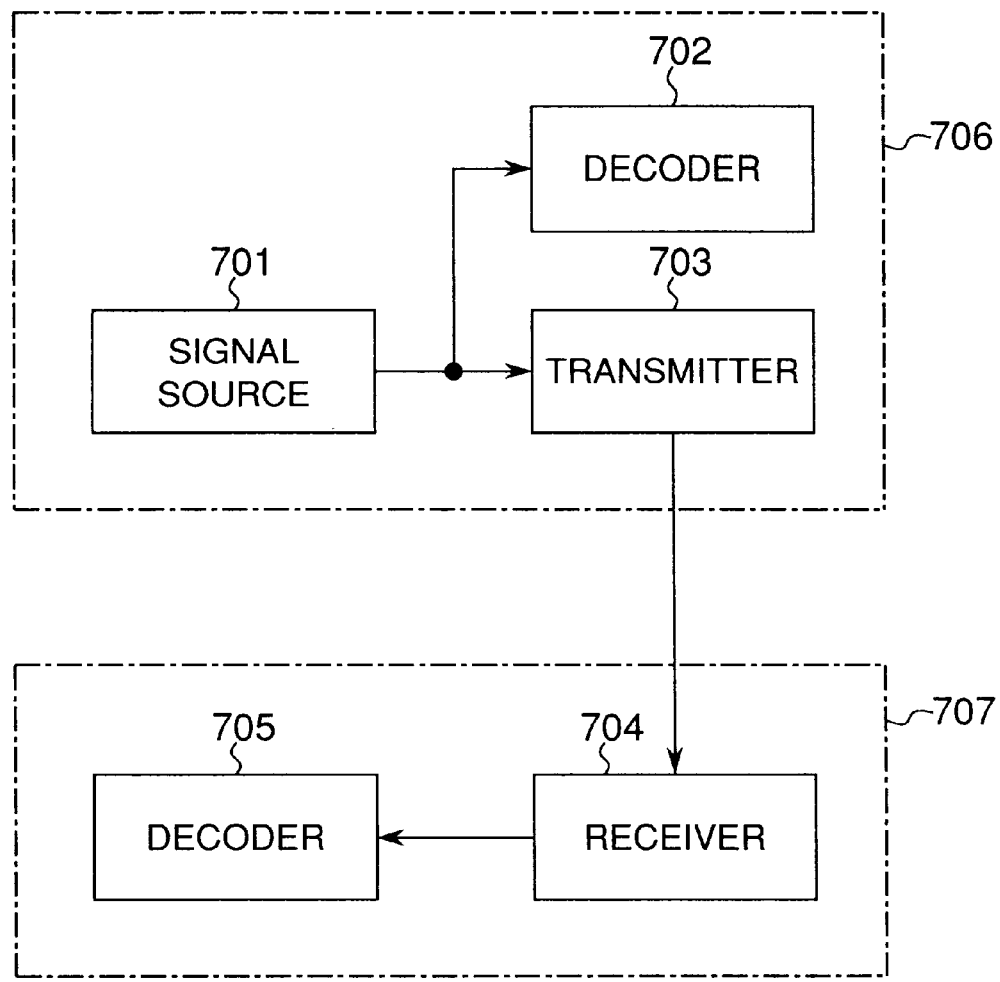
FIG. 7 is a block diagram of a video device comprising a built-in transmission/receiving circuit.

The second and third systems of the present invention relate to a transmission/receiving apparatus for sending and receiving MPEG2 transport packets by means of a transmission medium using a clock or cycle with no synchronization relationship to the signal source, similarly to the P1394 bus protocol. FIG. 7 is a block diagram of sending and receiving video devices (nodes) 706 and 707 for respectively sending and receiving MPEG2 data.

Video device 706 comprises a signal source 701, a decoder 702 for reconstructing to analog video and audio signals the video and audio data compressed according to the MPEG2 standard and supplied from the signal source 701, and a transmission circuit 703 for transmitting the transport packets to an external device.

Receiving video device 707 comprises a decoder 705 for reconstructing the video and audio data compressed according to the MPEG2 standard to analog video and audio signals, and a receiver circuit 704 for receiving the transport packets from an external device.

The signal source 701 may be, for example, a tuner for receiving packetized MPEG2 data transmitted from a broadcasting station by air wave or cable. The transmission circuit 703 outputs the MPEG2 data supplied from the signal source 701 to the transmission medium. The receiver circuit 704 then receives the MPEG2 data from the transmission medium. As does the transmission decoder 702, the receiving decoder 705 reconstructs the video and audio data compressed according to the MPEG2 standard to analog video and audio signals.

Figure 8:
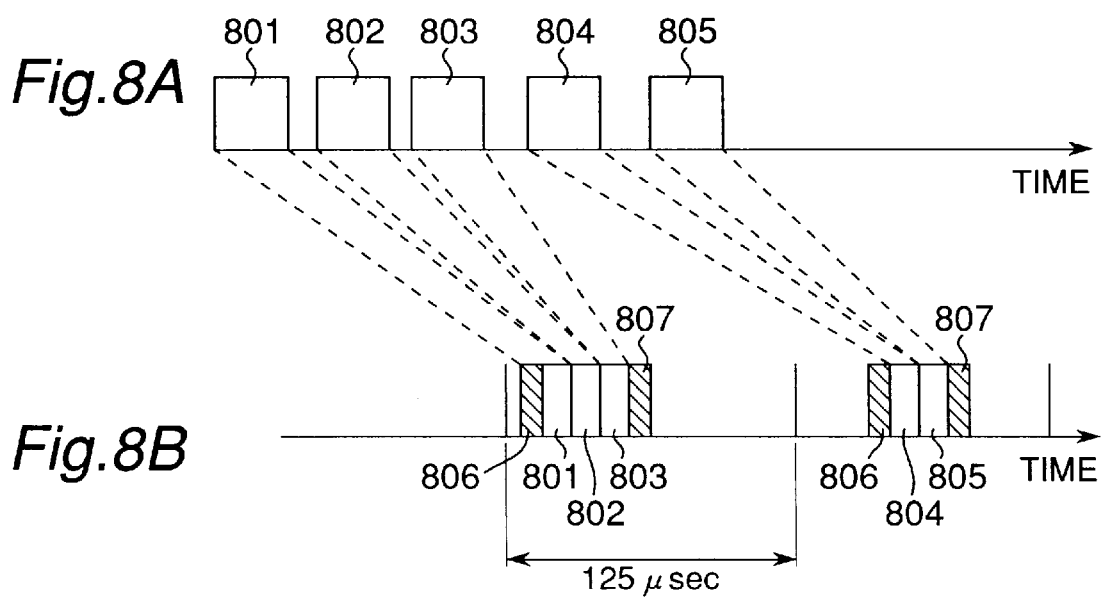
FIGS. 8A and 8B are timing charts showing the relationship between the transmitter and the timing of each transport packet on the IEEE P1394 bus.

FIGS. 8A and 8B show the changes in the timing of each transport packet or block when an MPEG2 transport packet string is output to the transmission path. The transport packets 801, 802, 803, 804, and 805 in FIG. 8A are output from the signal source 701 with calibrated time intervals inserted between TP801 and TP802, TP802 and TP803, TP803 and TP804, and TP804 and TP805, so that the decoder 702 can reconstruct the 27 MHz decoding clock. The decoder 702 is able to reconstruct the 2 7MHz decoding clock because each transport packet is input to the transmission-side decoder 702 at the same timing as it was output from the signal source 701.

The transmission circuit 703 then packetizes the transport packets output from the signal source 701 according to the P1394 protocol, and outputs to a P1394 bus. FIG. 8B shows the position of each transport packet on the bus. Each isochronous packet starts with a packet header 806 defined by the P1394 protocol, and ends with a CRC 807 for detecting transmission errors. Each these isochronous packets is output from the transmission circuit 703 synchronized to the P1394 clock in one P1394 cycle. In the example shown in FIG. 8B, the transmission circuit 703 combines transport packets 801, 802, and 803 output from the signal source to one isochronous packet output to the P1394 bus, and puts transport packets 804 and 805 into another isochronous packet, which is then similarly output.

As shown in FIG. 8B, the information about the interval between successive transport packets in FIG. 8A is lost on the P1394 bus. As a result, when the receiver circuit 704 receives these isochronous packets, it is not possible to output each transport packet to the decoder 705 at the same transport packet intervals shown in FIG. 8A. As a result, the decoder 705 could not reconstruct the 27 MHz decoding clock. The aim of the second and the third system of the present invention is to provide time information to each transport packet indicating the timing at which each transport packet should be produced to present the calibrated time intervals between the transport packets.

Second System

Figure 9:
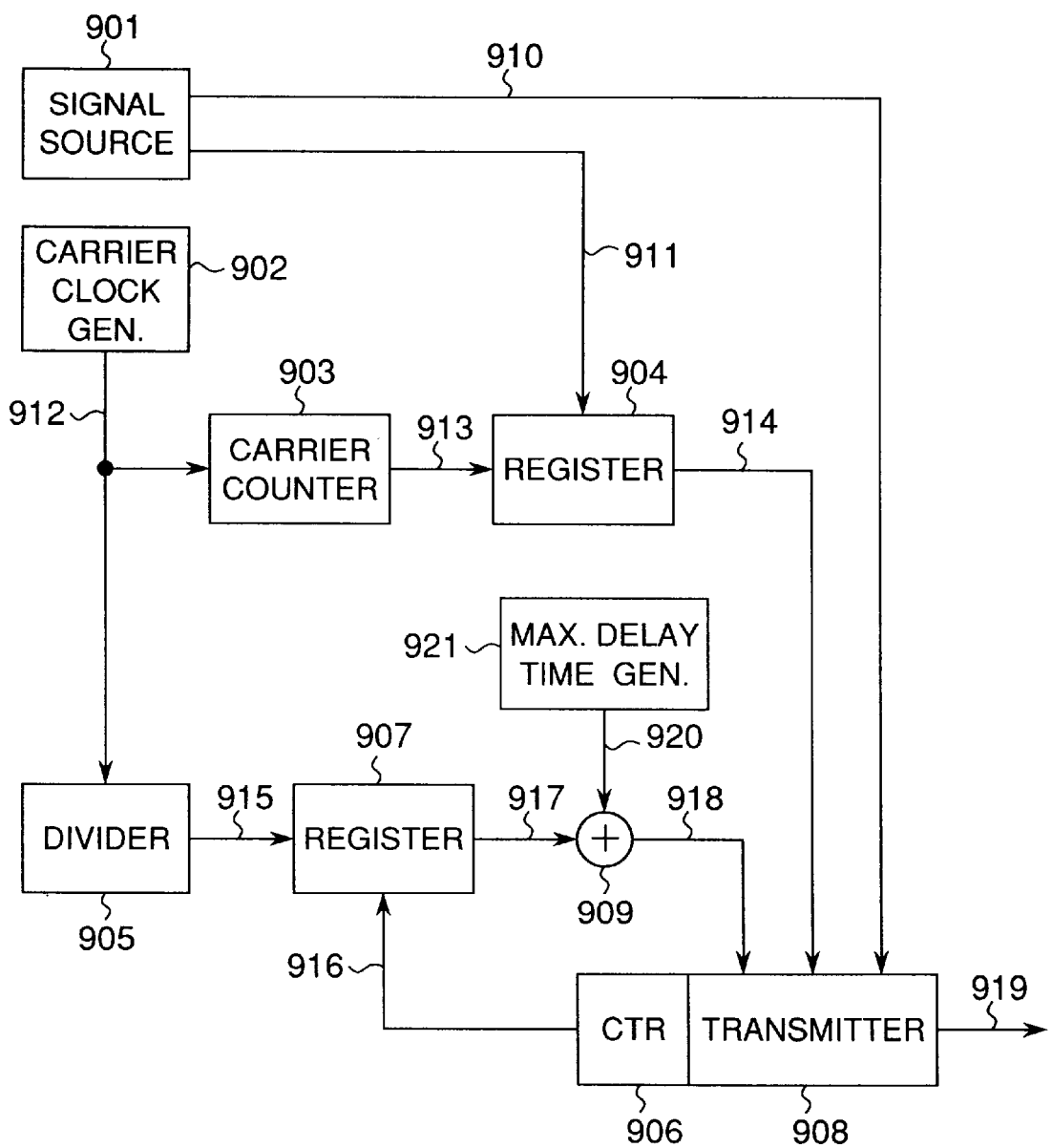
FIG. 9 is a block diagram of a transmission apparatus according to the second system of the present invention.

A transmission apparatus according to the second system of the present invention is described below with reference to FIG. 9, a block diagram thereof.

The transmission apparatus according to this second embodiment comprises a signal source 901, a carrier clock oscillator 902 (carrier clock generating means), a carrier counter 903 (counting means), a register 904 (second holding means), a frequency divider 905 (frequency dividing means), another register 907 (first holding means), a CTR 906 (a timing information generating means), a transmission circuit 908 (transmission means), a maximum delay time generator 921 (delay time generation means), and an adder 909 (adding means).

The signal source 901 packetizes the compressed video data, audio data, and text data to MPEG2 transport packets, and outputs the transport packets 910 to the transmission circuit 908. The signal source 901 also outputs the transport packet (TP) timing signal 911 to the register 904. Note that the TP timing signal 911 indicates the timing of the header data in the transport packet 910 output to the transmission circuit 908.

The carrier clock oscillator 902 generates the carrier clock 912. The carrier clock 912 is a signal with the same frequency as the data rate if the transport packet data rate is approximately 19.3 Mbps, and is a signal with a higher frequency (e.g., the same as the clock used on the P1394 bus, i.e., approximately 100 MHz) if the data rate is higher than 19.3 Mbps.

The carrier counter 903 counts the carrier clock 912, and sends the clock count to the register 904. The register 904 latches the count 913 determined by the carrier counter 903 when the transport packet timing signal 911 indicates the beginning of a transport packet. The count 914 held at every transport packet is then output to the transmission circuit 908. The frequency divider 905 divides the frequency of the carrier clock 912, and outputs the frequency-divided carrier clock 915. The cycle of the frequency-divided carrier clock 915 may be, for example, the frame frequency (such as V-sync signal) of current television broadcasting signals, or a multiple thereof.

Every node connected to the P1394 bus comprises a timing information generator (absolute time generator) known as a cycle time register (CTR). In the P1394 bus system, the timing is adjusted so that all devices on the bus show the same CTR value. A cycle time register CTR 906 is used as this timing information generating means in the present invention.

The CTR 906 outputs the timing information 916 to the register 907. The register 907 latches the timing information for each period of the frequency-divided carrier clock 915, and outputs the held timing information 917 to the adder 909. The adder 909 adds the maximum transmission delay time 920 produced from the maximum delay time generator 921 to the timing information 917, and outputs the sum to the transmission circuit 908. As in the first system of the present invention, the maximum transmission delay time 920 added to the timing information 917 by the adder 909 may be a value of CTR 906 equivalent to the sum of the maximum packetizing time and the maximum arbitration delay time, or a value of CTR 906 equivalent to the maximum packetizing time.

The transmission circuit 908 packetizes the transport packet 910, the count 914 for each transport packet, and the timing information 918 obtained by the adder 909, to a P1394-standard packet, and outputs the resulting isochronous packet 919. The structure of this isochronous packet 919 packetized by the transmission circuit 908 is shown in FIG. 10.

Figure 10:
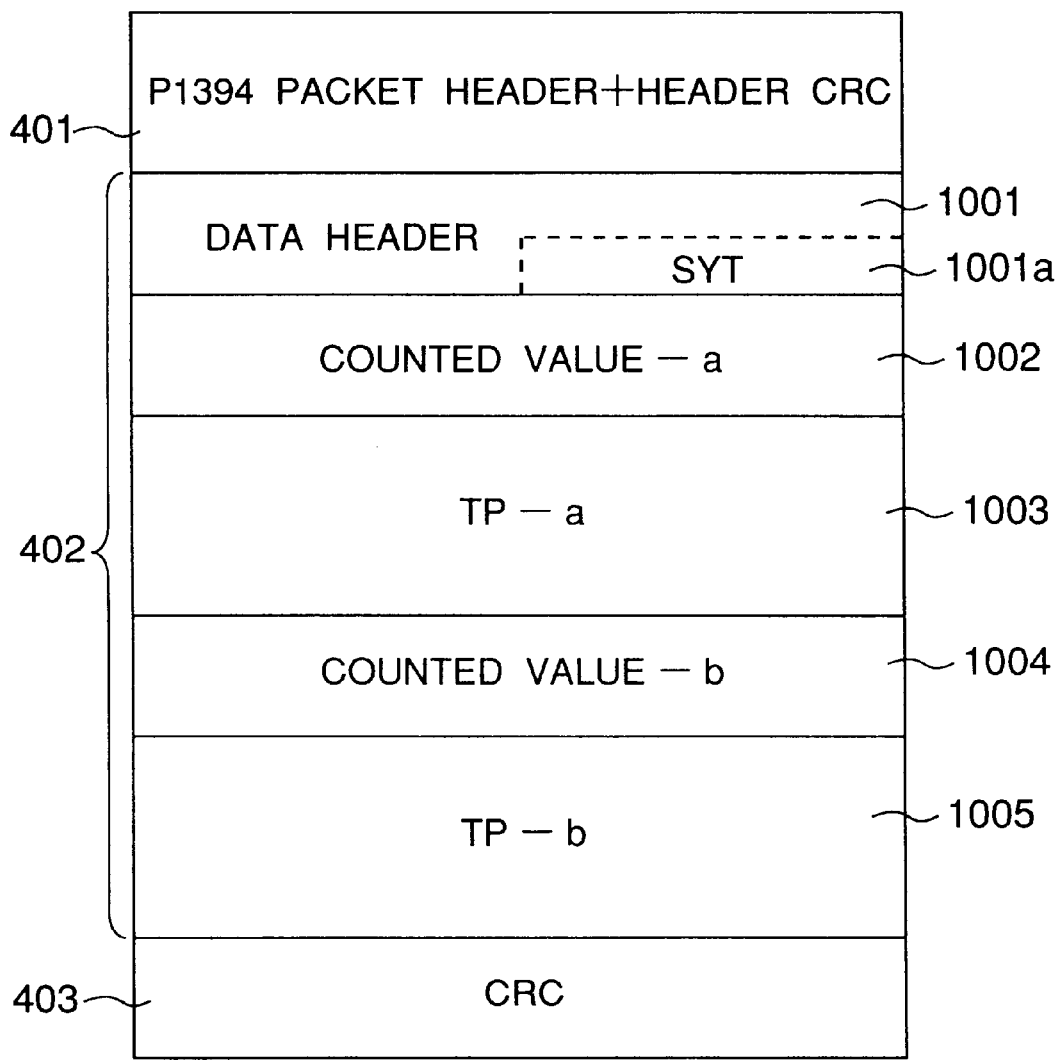
FIG. 10 is a packet diagram used to describe the structure of the isochronous packet output by the transmission apparatus according to the second system of the present invention.

FIG. 10 shows the structure of an isochronous packet containing two transport packets TP-a 1003 and TP-b 1005. As shown in FIG. 10, each isochronous packet comprises a header block 401 containing the isochronous packet (P1394) header and header CRC, a data field 402, and a CRC block 403 for the data in the data field 402. The isochronous packet header and header CRC block 401, and the CRC block 403, are defined by the P1394 protocol.

The data field 402 starts with a data header 1001 containing identifiers for the type of data being transmitted, and an SYT field 100a. The timing information 918 latched by the register 907 and added with the maximum delay time is written to the SYT field 1001a at each cycle of the frequency-divided carrier clock. The counted value-a 1002 and counted value-b 1004 are the counter values 914, respectively, written to the headers of the corresponding transport packets 1003 and 1005 transmitted in that isochronous packet. In FIG. 10, only two transport packets are shown, but any other numbers may be contained in the data field 402 as long as the size fits the data field 402.

The timing information 918 shows the timing of a specific carrier count interval, i.e., the frequency information of the transmission-side carrier clock 912, and enables the receiver to reconstruct the carrier clock even after transmission via a P1394 bus. Count 914 shows the timing at which the signal source 901 output the header information for each transport packet, and is transmitted with each transport packet over the P1394 bus to enable the receiver to reconstruct the output timing of each transport packet.

Figure 11:
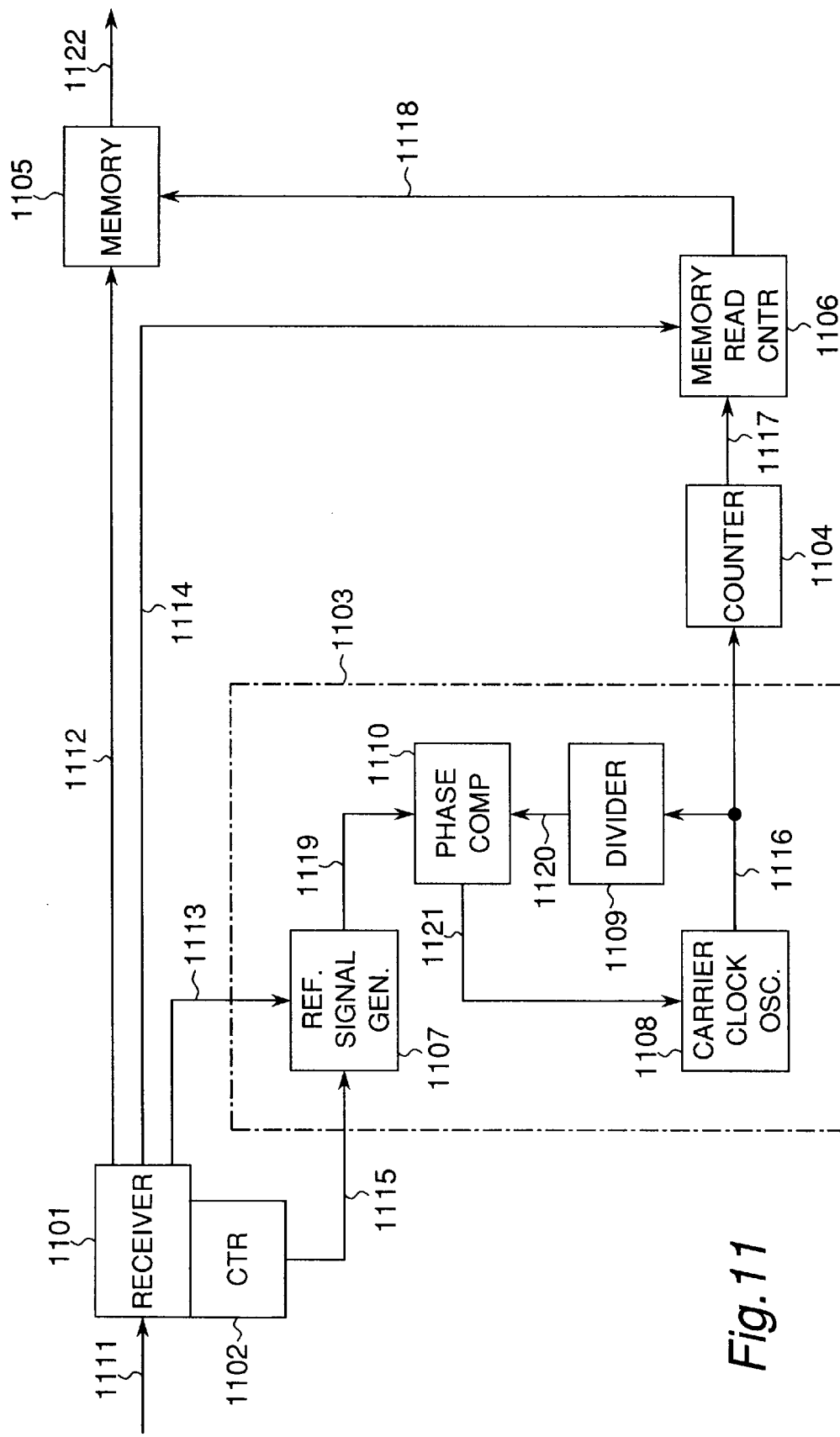
FIG. 11 is a block diagram of the first embodiment of a receiving apparatus according to the second system of the present invention.

FIG. 11 is a block diagram of the first embodiment of a receiving apparatus according to the second system of the present invention, and compatible with the transmission apparatus described above in connection with FIG. 9, provided that the maximum transmission delay time 920 fixed in the maximum delay time generator 921 is equivalent to the sum of the maximum packetizing time and the maximum arbitration delay time. The receiving apparatus of FIG. 11 comprises a receiver circuit 1101 (receiving means), cycle time register (CTR) 1102 (a timing information generating means), a carrier clock reconstruction circuit 1103 (carrier clock reconstruction means), a counter 1104 (counting means), memory 1105 (storage means), and a memory reading controller 1106 (control means).

The isochronous packet 1111 is received from a P1394 bus by the receiver circuit 1101, which extracts the transport packets, received timing information, and the received count. Note that the extracted transport packets 1112 are transport packets TP-a 1003 and TP-b 1005 in FIG. 10. The received timing information 1113 is the information written to the SYT field 1001a in FIG. 10. The received counts 1114 are counted value-a 1002 and counted value-b 1004 in FIG. 10.

The receiver circuit 1101 then outputs the transport packet extracted from the isochronous packet as transport packet 1112 to the memory 1105. The receiver circuit 1101 also outputs the received timing information 1113 and the received count 1114 extracted from the isochronous packet to the carrier clock reconstruction circuit 1103 and the memory reading controller 1106, respectively.

The memory 1105 stores transport packet 1112. The stored transport packet 1112 is output from the memory 1105 to the internal circuitry of the receiver at the read start timing indicated by the read start signal 1118 output from the memory reading controller 1106. This internal circuitry may be, for example, a decoder for reconstructing the compressed audio/video data, or a VCR for recording the transmitted transport packets to tape.

The output value of the CTR 1102 is the same value output by the CTR 906 on the transmission side. The carrier clock reconstruction circuit 1103 reconstructs the carrier clock based on the received timing information 1113 and the timing information 1115 output from the CTR 1102, and outputs the reconstructed carrier clock 1116. The carrier clock 1116 is time-difference synchronized to the transmission-side carrier clock 912. The counter 1104 then counts the reconstructed carrier clock 1116.

When the count output by the counter 1104 is equal to the received count 1114, the memory read controller 1106 outputs the read start signal 1118 to the memory 1105 to start reading.

The carrier clock reconstruction circuit 1103 is described next. As shown in FIG. 11, the carrier clock reconstruction circuit 1103 comprises a reference signal generator 1107 (first comparison signal generating means), a frequency divider 1109 (a second comparison signal generating means), a phase comparator 1110 (phase comparison means), and a carrier clock oscillator 1108 (carrier clock generating means).

The reference signal generator 1107 compares the received timing information 1113 output from the receiver circuit 1101 and the value of timing information 1115 output by the CTR 1102, and outputs a first reference pulse as the first reference signal 1119 the moment the value of the timing information 1115 becomes equal to or greater than the received timing information 1113. The P1394 bus system adjusts the timing so that the values of the transmission-side CTR 906 and the receiving-side CTR 1102 are always the same. As a result, if the timing information 917 held in the register 907 was transmitted without the maximum transmission delay time α being added at the transmission side, the value of the receiver-side CTR 1102 when an isochronous packet is received may already be greater than the received timing information, and the first reference signal cannot be generated. The present invention therefore adds at the transmission-side a value of CTR 906 equivalent to the maximum transmission delay time before transmission.

When an isochronous packet to which the received timing information is added is received, the value of the receiver-side CTR 1102 is less than the value of the received timing information. As a result, the receiving apparatus can correctly generate the first reference signal.

The carrier clock oscillator 1108 generates the carrier clock 1116 at essentially the same frequency as the transmission-side carrier clock 912. The carrier clock oscillator 1108 also varies the frequency of the carrier clock 1116 based on the phase error signal 1121 input from the phase comparator 1110.

The frequency divider 1109 frequency-divides the carrier clock 1116 at the same rate used by the frequency divider 905 on the transmission-side, and thus generates a second reference pulse as the second reference signal 1120. The phase comparator 1110 detects the phase error between the first reference signal 1119 and the second reference signal 1120, and outputs the resulting phase error signal 1121.

The carrier clock oscillator 1108 which is a voltage controlled oscillator, is controlled by the phase error signal 1121, and changes the frequency of the carrier clock 1116 so that the phase error between the first and second reference signals is reduced. The carrier clock reconstruction circuit 1103 is thus able to time-difference synchronize the receiver-side carrier clock 1116 to the transmission-side carrier clock 912.

FIG. 12 shows the relationship between the output timing of each transport packet by the signal source 901 on the transmission side, and the read timing of each transport packet from the memory 1105 on the receiver side.

FIG. 12B shows the timing at which the transmission-side signal source 901 outputs the transport packets. Count C1 at the beginning of transport packet 1201b is transmitted with transport packet 1201b. Counts C2 and C3 at the beginnings of transport packets 1202b and 1203b, respectively, are likewise transmitted with those transport packets 1202b and 1203b.

FIG. 12A shows count 913, i.e., the value of the carrier counter 903 on the transmission side, and FIG. 12C shows count 1117, i.e., the value of the counter 1104 on the receiver side. The receiver initializes the value of the counter 1104 at the start of receiving using the received count 1114. The carrier clock reconstruction circuit 1103 synchronizes the transmission- and receiver-side carrier clocks, and the carrier count/timing curves shown in FIGS. 12A and 12C therefore have the same slope.

FIG. 12D shows the timing at which the transport packets are read from the receiver-side memory 1105. Based on the control signal from the memory read controller 1106, the memory 1105 outputs transport packet 1201d when the value of counter 1104 and the received count C1 are equal. Transport packets 1202d and 1203d are likewise read out when the value of counter 1104 is equal to the received counts C2 and C3, respectively. The timing of each transport packet can thus be accurately reconstructed by the receiving apparatus.

The signal source 901 must output each transport packet synchronized to some clock, and the carrier clock oscillator 902 can be used as the oscillation circuit for that clock. In this case, each transport packet is output synchronized to the carrier clock 912. This carrier clock is then reconstructed by the carrier clock reconstruction circuit 1103 on the receiver side according to the present invention. The output timing of each transport packet is also expressed by the counter value of the carrier clock on the transmission side, and the transport packets are read from the memory 1105 on the receiver side based on this counter value. Therefore, when the signal source 901 uses the carrier clock as the clock for outputting each transport packet as described above, the output timing of each transport packet output by the signal source 901 can be reconstructed on the receiving apparatus without even one bit of error.

Note that the first embodiment of the receiving apparatus described above is for a receiving apparatus used when the maximum transmission delay time 920 added on the transmission-side is the sum of the maximum packetizing time and the maximum arbitration delay time. The second embodiment of a receiving apparatus described below is compatible with a transmission apparatus in which the maximum transmission delay time 920 is the maximum packetizing time. This second embodiment of a receiving apparatus is described with reference to the block diagram in FIG. 13.

Figure 13:
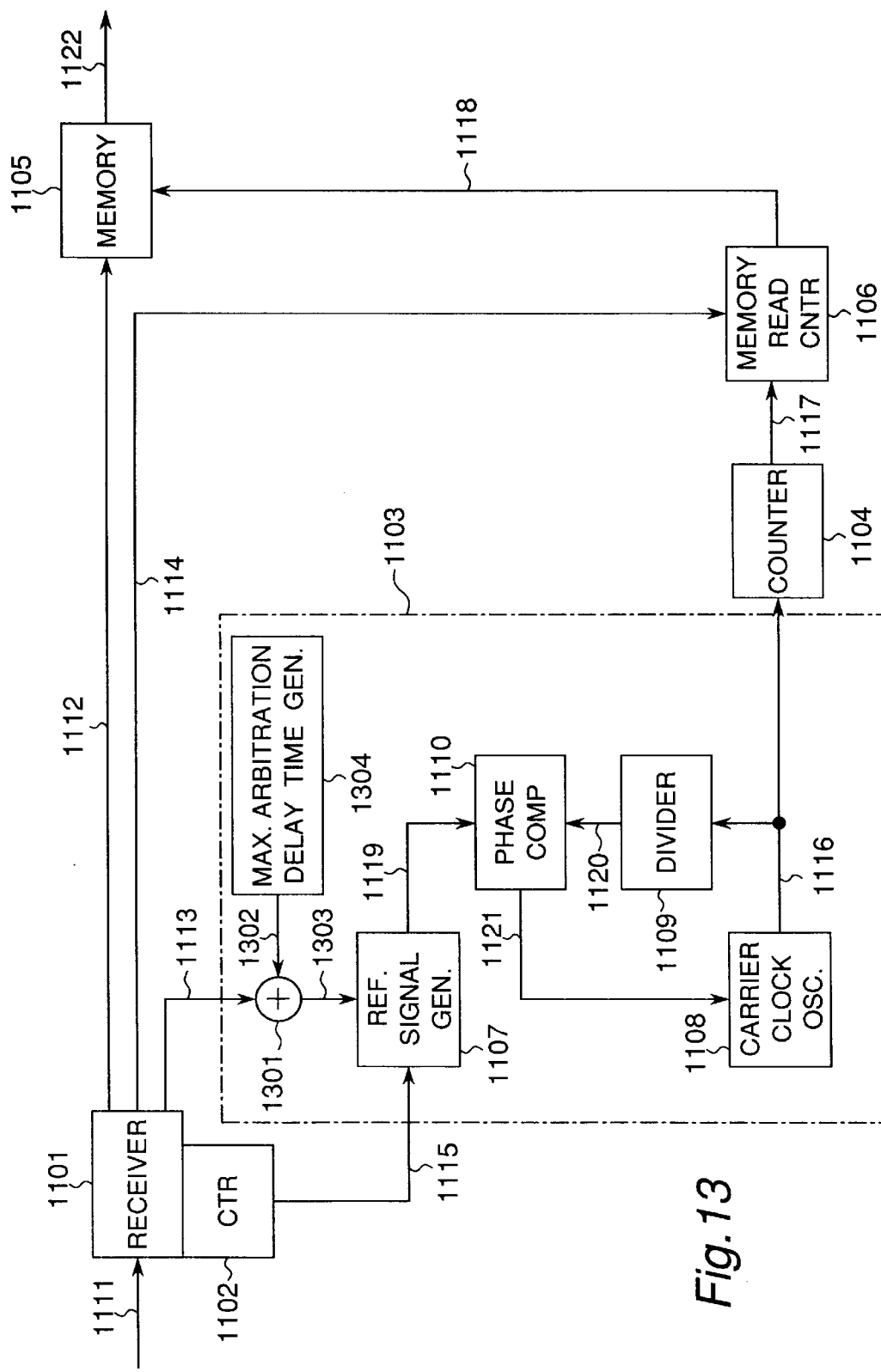
FIG. 13 is a block diagram of the second embodiment of a receiving apparatus according to the second embodiment of the present invention.

Referring to FIG. 13, the second embodiment of a receiving apparatus according to the second system of the present invention is shown. The receiving apparatus of FIG. 13 is compatible with the transmission apparatus of FIG. 9, provided that the maximum transmission delay time 920 fixed in the maximum delay time generator 921 is the maximum packetizing time. The receiving apparatus of FIG. 13, further comprises, when compared with that of FIG. 11, a maximum arbitration delay generator 1304 and an adder 1301 which are provided in the carrier clock reconstruction circuit 1103. The received timing information 1113 in this embodiment is the sum of the timing information 917 held by the register 907 and the maximum packetizing time. It is therefore possible that the value of the receiver-side CTR 1102 is already greater than the received timing information 1113 when the received timing information is received. It is therefore possible with the first embodiment of a receiving apparatus described above that the reference signal generator 1107 cannot correctly generate the first reference signal 1119.

In this second embodiment of a receiving apparatus, therefore, the adder 1301 adds the maximum arbitration delay time 1302 from the maximum arbitration delay time generator to the received timing information 1113. When the received timing information 1113 is received by the receiving apparatus, the sum 1303 is therefore always greater than the value of the receiver-side CTR 1102.

As a result, the reference signal generator 1107 can correctly generate the first reference signal 1119, and the carrier clock 1116 can therefore be reconstructed by the receiving apparatus, even when the maximum transmission delay time 920 on the transmission side is the maximum packetizing time.

Third System

The third system of a transmission apparatus according to the present invention is described below with reference to FIG. 14, a block diagram thereof.

The transmission apparatus according to this third system, which is a simplified version of the second system, comprises a signal source 1401, a CTR 1402 (a timing information generating means), a register 1403 (holding means), an adder 1404 (adding means), a maximum delay time generator 1413 (delay time generation means), and a transmission circuit 1405 (transmission means).

The signal source 1401 packetizes the compressed video data, audio data, and text data to MPEG2 transport packets, and outputs each transport packet 1406 to the transmission circuit 1405. The signal source 1401 also outputs the transport packet (TP) timing signal 1407 to the register 1403. Note that the TP timing signal 1407 indicates the timing of the first data in the transport packet 1406 output to the transmission circuit 1405.

The CTR 1402 outputs the timing information 1408, i.e., the P1394 CTR value. The register 1403 holds the value of the timing information 1408 when the transport packet timing signal 1407 indicates the beginning of a transport packet, and outputs the timing information 1411 for each transport packet to the adder 1404.

The adder 1404 adds the maximum transmission delay time 1409 to the timing information 1411, and outputs the sum to the transmission circuit 1405. Note that the maximum transmission delay time 1409 added by the adder 1404 to the timing information 1411 may be a value of CTR 1402 equivalent to the sum of the maximum packetizing time and the maximum arbitration delay time, or a value of CTR 1402 equivalent to the maximum packetizing time.

The transmission circuit 1405 packetizes the transport packet 1406 and the timing information 1410 of each transport packet obtained by the adder 1404 to a P1394-standard packet, and outputs the resulting isochronous packet 1412. The structure of this isochronous packet 1412 is shown in FIG. 15.

Figure 15:
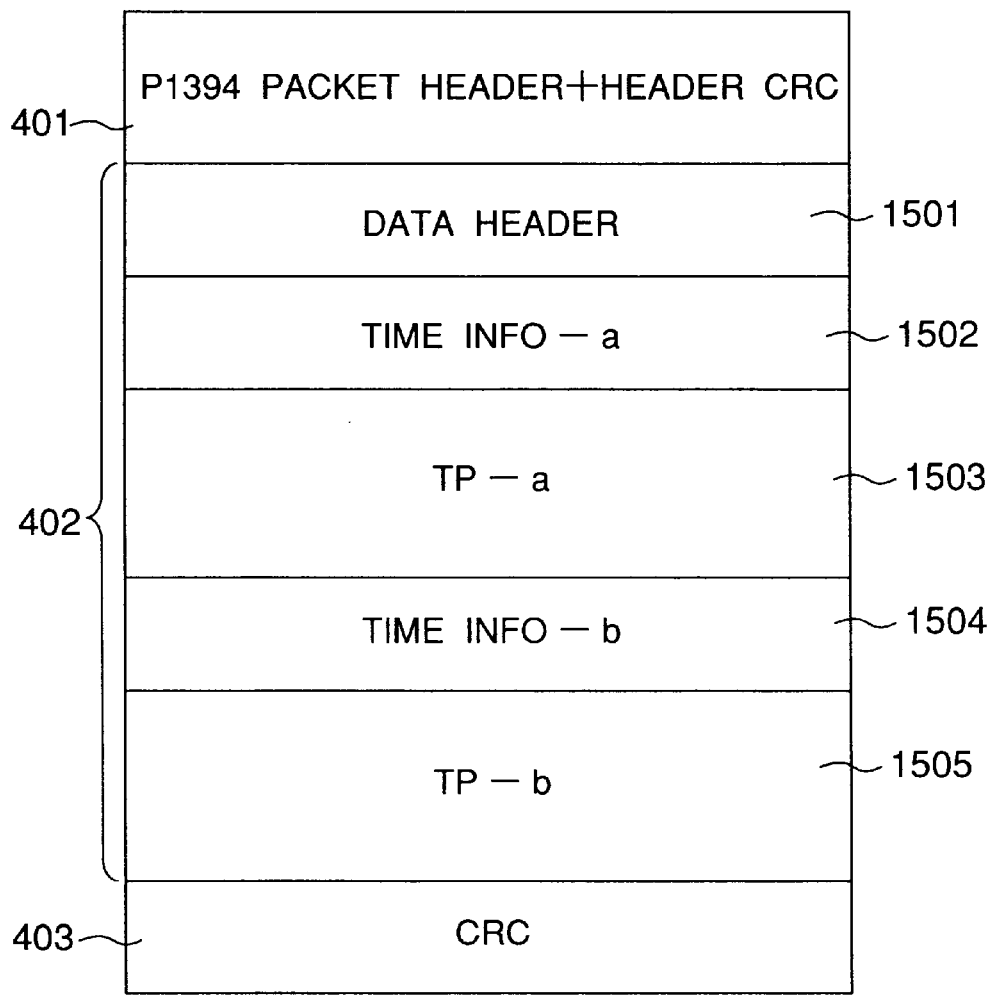
FIG. 15 is a packet diagram used to describe the structure of the isochronous packet output by the transmission apparatus according to the third system of the present invention.

FIG. 15 shows the structure of an isochronous packet containing two transport packets TP-a 1003 and TP-b 1005. As shown in FIG. 15, each isochronous packet comprises a header block 401 containing the isochronous packet (P1394) header and header CRC, a data field 402, and a CRC block 403 for the data in the data field 402. The isochronous packet header and header CRC block 401, and the CRC block 403, are defined by the P1394 protocol.

The data field 402 starts with a data header 1501 containing identifiers for the type of data being transmitted. The timing information 1410 written to the beginning of each transport packet transmitted by the isochronous packet is written to timing information-a 1502 and timing information-b 1504 preceding the respective transport packets.

The timing information 1410 shows the timing at which the first data in each transport packet was output by the signal source 1401, and is transmitted with the corresponding transport packet over the P1394 bus. The receiver side is thus able to reconstruct the output timing of each transport packet.

Figure 14:
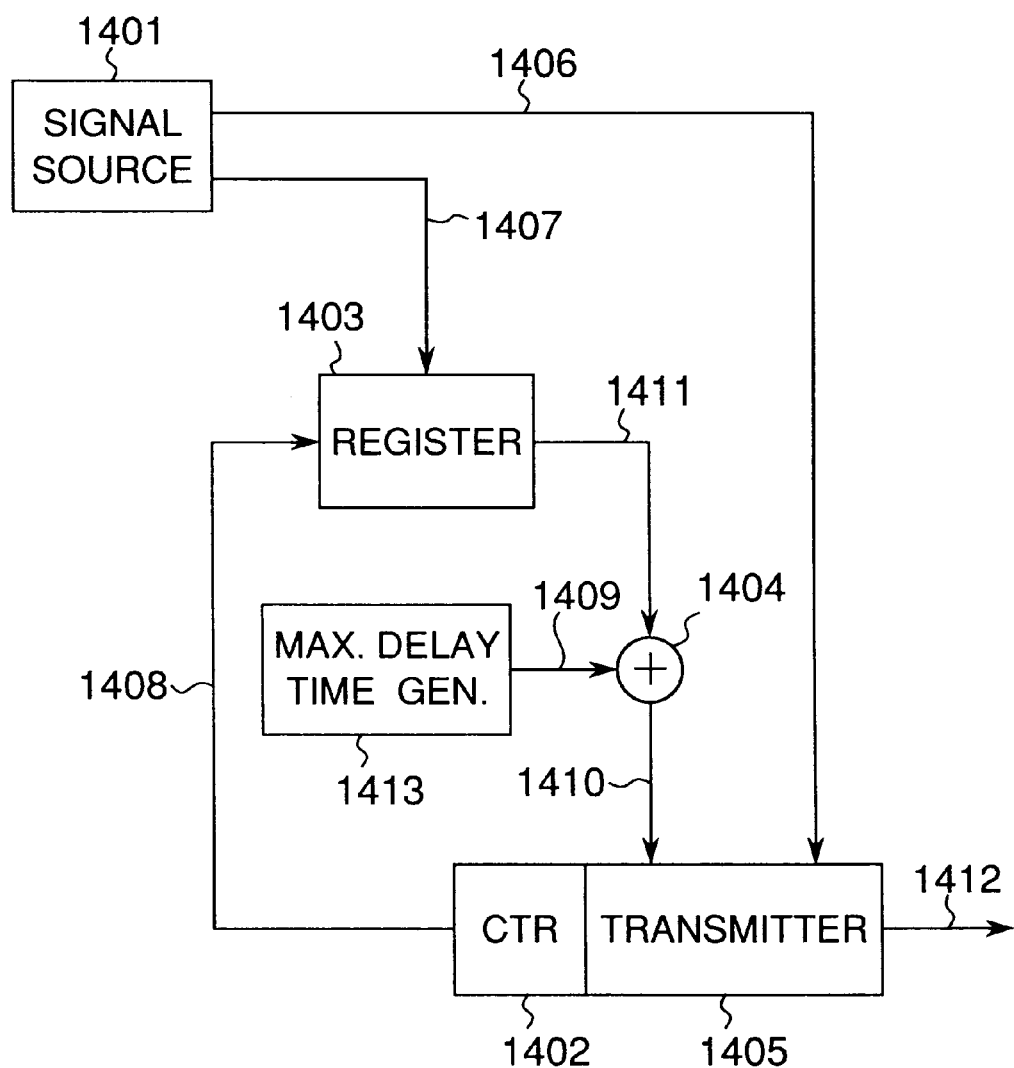
FIG. 14 is a block diagram of a transmission apparatus according to the third system of the present invention.
Figure 16:
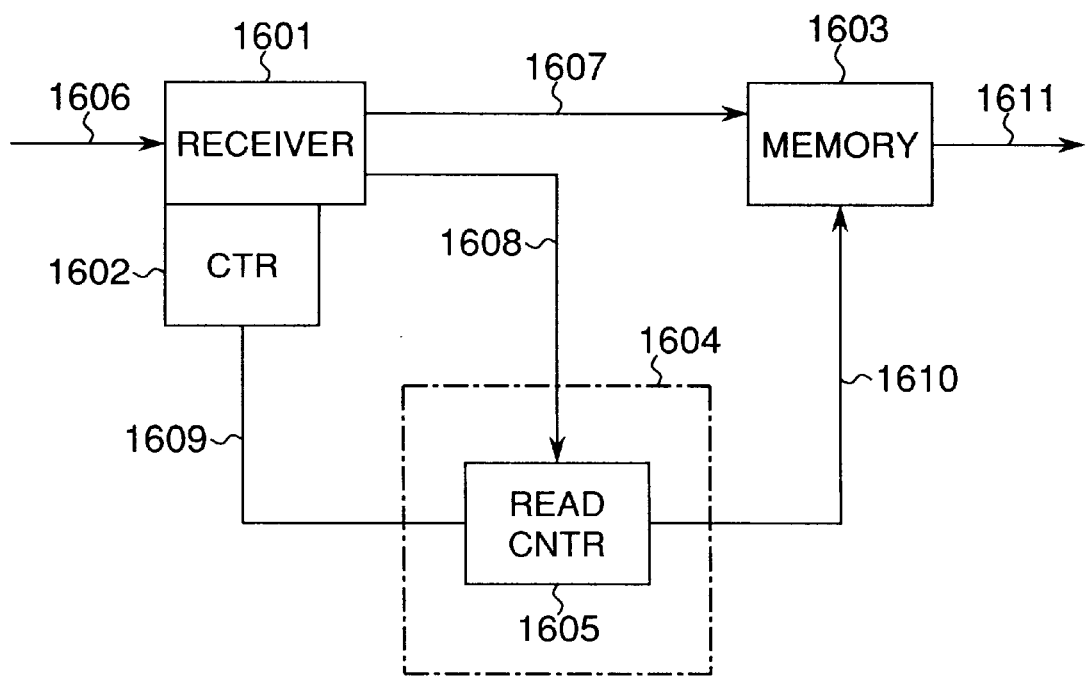
FIG. 16 is a block diagram of the first embodiment of a receiving apparatus according to the third system of the present invention.

FIG. 16 is a block diagram of the first embodiment of a receiving apparatus compatible with the transmission apparatus of FIG. 14, provided that the maximum transmission delay time 1409 fixed in the maximum delay time generator 1413 is equivalent to the sum of the maximum packetizing time and the maximum arbitration delay time. This receiving apparatus comprises a receiver circuit 1601 (receiving means), cycle time register (CTR) 1602 (a timing information generating means), a memory 1603 (storage means), and a control circuit 1604 (control means).

The isochronous packet 1606 is received from a P1394 bus by the receiver circuit 1601, which extracts the transport packets and received timing information. Note that the extracted transport packets 1607 are transport packets-a 1503 and transport packets-b 1505 in FIG. 15. The received timing information 1608 is the information written to the timing information-a 1502 and timing information-b 1503 in FIG. 15.

The receiver circuit 1601 outputs the transport packets extracted from the isochronous packet as transport packets 1607 to the memory 1603, and outputs the received timing information 1608 to the control circuit 1604.

The memory 1603 then stores the transport packet 1607. The stored transport packet 1611 is output from the memory 1603 to the internal circuitry of the receiver at the read start timing indicated by the read start signal 1610 output from the reading controller 1604. This internal circuitry may be, for example, a decoder for reconstructing the compressed audio/video data, or a VCR for recording the transmitted transport packets to tape.

The control circuit 1604 controls reading transport packets from the memory 1603 based on the timing information 1609 output by the CTR 1602 and the received timing information 1608. When it is time to read a transport packet, the control circuit 1604 outputs the read start signal 1610 instructing the memory 1603 to start reading.

The control circuit 1604 basically comprises a read controller 1605. The received timing information 1608 output by the receiver circuit 1601 is the sum, obtained by the signal source 1401 on the transmission-side, of the maximum transmission delay time 1409 added to the value of the CTR 1402 at the beginning of each transport packet. The read controller 1605 outputs the read start signal 1610 instructing the memory 1603 to output the corresponding transport packet the moment the value of the timing information 1609 output by the CTR 1602 becomes equal to or greater than the received timing information 1608.

FIGS. 18A–18D show the relationship between the output timing of each transport packet by the signal source 1401 on the transmission side, and the read timing of each transport packet from the memory 1603 on the receiver side. FIG. 18B shows the timing at which the transmission-side signal source 1401 outputs the transport packets. The sum (T1+α), obtained by adding the maximum transmission delay time 1409 to the value T1 of the CTR 1402 at the beginning of transport packet 1801b, is transmitted with transport packet 1801b. Note that α is the maximum transmission delay time 1409 in sum (T1+α). The similar sums (T2+α) and (T3+α) obtained by adding the maximum transmission delay time 1409 to the values T2 and T3 of the CTR 1402 at the beginning of transport packets 1802b and 1803b are likewise transmitted with transport packets 1802b and 1803b, respectively.

FIG. 18A shows the value of the transmission-side CTR 1402, and FIG. 18C shows the value of the receiver-side CTR 1602. The P1394 protocol adjusts the timing so that all devices on the bus show the same CTR value. As a result, FIGS. 18A and 18C are the same. FIG. 18D shows the transport packet read timing from the receiver-side memory 1603. The memory 1603 is controlled by the read controller 1605 to read transport packet 1801d when the value of the CTR 1602 exceeds the value (T1+α) of the received timing information 1608 as shown in FIGS. 18C and 18D. Transport packets 1802d and 1803d are likewise read when the value of the CTR 1602 exceeds the received timing information values (T2+α) and (T3+α) respectively.

As a result, the timing of each transport packet can be correctly reconstructed by the receiving apparatus.

In the P1394 bus system, the timing is adjusted so that all devices on the bus show the same CTR value. As a result, if the timing information 1411 held by the register 1403 was transmitted without the maximum transmission delay time α being added at the transmission side, the value of the receiver-side CTR 1602 when an isochronous packet is received may already be greater than the received timing information, and the read start signal 1610 cannot be generated. The present invention therefore adds at the transmission-side a value of CTR 1402 equivalent to the maximum transmission delay time before transmission.

When an isochronous packet to which the received timing information is added is received, the value of the receiver-side CTR 1602 is less than the value of the received timing information. As a result, the receiving apparatus can correctly generate the read start signal 1610.

Figure 17:
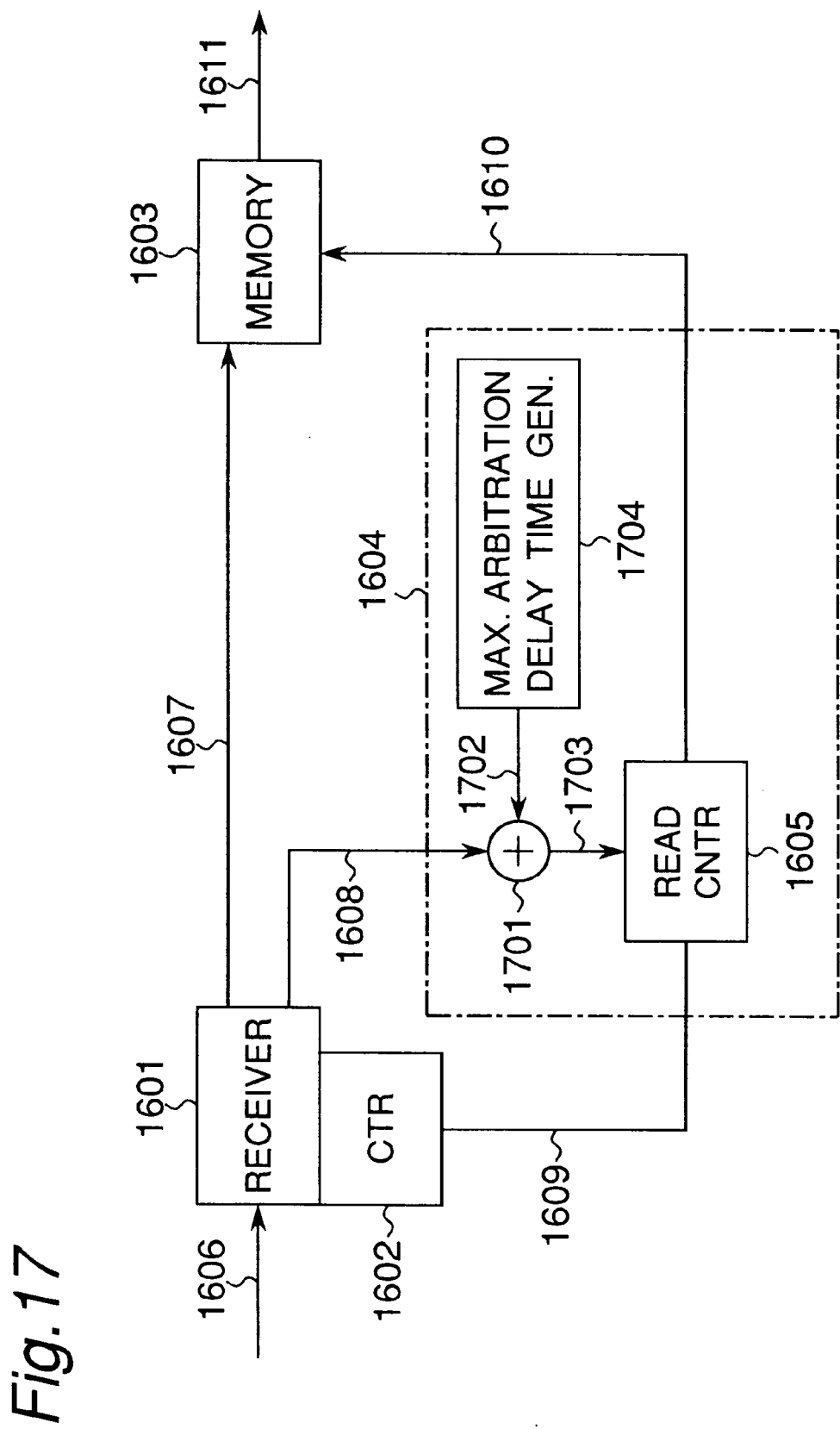
FIG. 17 is a block diagram of the second embodiment of a receiving apparatus according to the third system of the present invention.

Note that the embodiment of the receiving apparatus described above is for a receiving apparatus used when the maximum transmission delay time 1409 added on the transmission-side is the sum of the maximum packetizing time and the maximum arbitration delay time. The second embodiment of a receiving apparatus described below is compatible with a transmission apparatus of FIG. 14 provided that the maximum transmission delay time 1409 fixed in the maximum delay time generator 1413 is the maximum packetizing time. This second embodiment of a receiving apparatus is described with reference to the block diagram in FIG. 17.

This second embodiment of a receiving apparatus according to the third system of the present invention further comprises in the control circuit 1604 a maximum arbitration delay time generator 1704 and an adder 1701. The received timing information 1608 in this embodiment is sum of the timing information 1411 held by the register 1403 and the maximum packetizing time. It is therefore possible that the value of the receiver-side CTR 1602 is already greater than the received timing information 1608 when the received timing information is received. As a result, it is possible with the first embodiment of a receiving apparatus described above that the read controller 1605 cannot correctly generate the read start signal 1610.

In this second embodiment of a receiving apparatus, therefore, the adder 1701 adds the maximum arbitration delay time 1702 from the maximum arbitration delay time generator 1704 to the received timing information 1608. When the received timing information is received by the receiving apparatus, the sum 1703 is thus always greater than the value of the receiver-side CTR 1602.

As a result, the read controller 1605 can correctly generate the read start signal 1610, and the transport packet timing can therefore be reconstructed by the receiving apparatus, even when the maximum transmission delay time 1409 on the transmission side is the maximum packetizing time.

While it is otherwise necessary to pre-define the frequency of the carrier clock used by the transmission apparatus and the frequency of the carrier clock of the receiving apparatus, it is not necessary to define the carrier clock frequency with this third system because the carrier clock is not used. Because the carrier clock is not used, it is therefore also not necessary to provide circuitry for reconstructing the carrier clock.

In the second and third systems described above, the sum of the count when the signal source output the first data in each transport packet, the timing information, and the maximum transmission delay time is transmitted, but the same effect can be obtained by transmitting, for example, the sum of the count at any particular point (including the end) in each transport packet, the timing information, and the maximum transmission delay time.

In the first, second, and third systems of the present invention, the maximum packetizing time is added, at the least, to the timing information before transmission by the transmission apparatus. When the maximum packetizing time is not added at the transmission side, the maximum time is not added at the receiver. However, the maximum packetizing time may vary according to the data rate of the transmitted data, or the circuit configuration of the transmission apparatus. Therefore, if the maximum packetizing time is added at the receiver side, the receiver side must know, by some means, the maximum packetizing time of the transmitted data. Because the transmission apparatus according to the present invention adds the maximum packetizing time before transmission, the receiving apparatus does not need to consider the maximum packetizing time, and only needs to compare the received timing information with the receiver-side CTR value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission apparatus comprising:
   signal source means for outputting audio/video data and synchronization signal;
   clock time generating means for generating a clock time;
   holding means for holding a clock time in response to said synchronization signal;
   transmission delay time generation means for generating a predetermined transmission delay time;
   adding means for adding said predetermined transmission delay time to the clock time held by the holding means and producing a timing information; and
   transmission means for transmitting said timing information together with the audio/video data.

2. A receiving apparatus for receiving audio/video data together with timing information from a transmission apparatus, said timing information being equal to a sum of a clock time of a synchronization signal as generated in the transmission apparatus and a predetermined transmission delay time, said receiving apparatus comprising:
   receiving means for receiving said audio/video data together with said timing information;

clock time generating means for generating a clock time;

first reference signal generating means for generating a first reference signal when said clock time matches with said timing information;

second reference signal generating means for generating a second reference signal having a predetermined frequency; and phase correction means for correcting the phase of said second reference signal to be in-phase with said first reference signal, whereby said second reference signal is time-difference synchronized with said video signal frame synchronization signal by a time difference of said predetermined transmission delay time.

3. A receiving apparatus for receiving audio/video data together with timing information from a transmission apparatus, said timing information being equal to a sum of a clock time of a synchronization signal as generated in the transmission apparatus and a predetermined transmission delay time, said receiving apparatus comprising:

receiving means for receiving said audio/video data together with said timing information;

memory means for storing said audio/video data;

clock time generating means for generating a clock time;

read out timing control means for producing a read out signal when said clock time coincides with said timing information, said audio/video data in said memory means being read out in response to said read out signal.

4. A receiving apparatus according to claim 3, further comprising:

a receiver delay time generation means for generating a predetermined receiver delay time; and adding means for adding said predetermined receiver delay time to said timing information and producing a sum signal, whereby said read out signal is produced when said clock time coincides with said sum signal.

5. A system having a transmission apparatus and a receiving apparatus for transmitting audio/video data from said transmission apparatus to said receiving apparatus, said transmission apparatus comprising:

signal source means for outputting audio/video data and synchronization signal;

clock time generating means for generating a clock time;

holding means for holding a clock time in response to said synchronization signal;

transmission delay time generation means for generating a predetermined transmission delay time;

adding means for adding said predetermined transmission delay time to the clock time held by the holding means and producing a timing information; and transmission means for transmitting said timing information together with the audio/video data; and said receiving apparatus comprising:

receiving means for receiving said audio/video data together with said timing information;

clock time generating means for generating a clock time;

first reference signal generating means for generating a first reference signal when said clock time matches with said timing information;

second reference signal generating means for generating a second reference signal having a predetermined frequency; and phase correction means for correcting the phase of said second reference signal to be in-phase with said first reference signal, whereby said second reference signal is time-difference synchronized with said synchronization signal by a time difference of said predetermined transmission delay time.

6. A receiving apparatus according to claim 5 wherein said first reference signal generating means comprises a comparison means for comparing the clock time and said timing information.

7. A receiving apparatus according to claim 5 wherein said first reference signal generating means comprises:

a receiver delay time generation means for generating a predetermined receiver delay time;

adding means for adding said predetermined receiver delay time to said timing information and producing a sum signal; and a comparison means for comparing the clock time and said sum signal, whereby said second reference signal is time-difference synchronized with said synchronization signal by a time difference of said predetermined transmission delay time plus said predetermined receiver delay time.

8. A transmission apparatus comprising:

signal source means for outputting audio/video data in blocks and block synchronization signal;

carrier clock generating means for generating a carrier clock;

counting means for counting the carrier clock and for producing a carrier clock time;

first holding means for holding a carrier clock time in response to said block synchronization signal and for generating a first timing information;

frequency dividing means for frequency dividing the carrier clock by a predetermined value and for producing a carrier clock reference signal;

clock time generating means for generating a clock time;

second holding means for holding a clock time in response to said carrier clock reference signal;

transmission delay time generation means for generating a predetermined transmission delay time;

adding means for adding said predetermined transmission delay time to the clock time held by the holding means and producing a second timing information; and transmission means for transmitting said first and second timing information together with the audio/video data in blocks.

9. A receiving apparatus for receiving audio/video data together with first and second timing information from a transmission apparatus, said first timing information being equal to a synchronization signal as generated in the transmission apparatus, and said second timing information being equal to a sum of a clock time and a predetermined transmission delay time as generated in the transmission apparatus, said receiving apparatus comprising:

receiving means for receiving said audio/video data together with said first and second timing information;

clock time generating means for generating a clock time;

carrier clock reconstructing means for reconstructing the carrier clock time from said second timing information with reference to said clock time;

counting means for counting the carrier clock time;

memory means for storing said audio/video data received by the receiving means; and read out timing control means for producing a read out signal when said carrier clock time coincides with said second timing information, said audio/video data in said memory means being read out in response to said read out signal.

10. A receiving apparatus according to claim 9, wherein said carrier clock reconstructing means comprises:
   reference signal generation means for generating a base signal when said clock time coincides with said first timing information;
   carrier clock generating means for generating a carrier clock;
   frequency dividing means for frequency dividing the carrier clock by a predetermined value and for producing a carrier clock reference signal; and
   phase correction means for correcting the phase of said carrier clock reference signal to be in-phase with said base signal, whereby said carrier clock time is time-difference synchronized with said carrier clock time in the transmission apparatus by a time difference of said predetermined transmission delay time.

11. A receiving apparatus according to claim 9, wherein said carrier clock reconstructing means comprises:
   a receiver delay time generation means for generating a predetermined receiver delay time;
   adding means for adding said predetermined receiver delay time to said first timing information and producing a sum signal;
   reference signal generation means for generating a base signal when said clock time coincides with said sum signal;
   carrier clock generating means for generating a carrier clock;
   frequency dividing means for frequency dividing the carrier clock by a predetermined value and for producing a carrier clock reference signal; and
   phase correction means for correcting the phase of said carrier clock reference signal to be in-phase with said base signal, whereby said carrier clock time is time-difference synchronized with said carrier clock time in the transmission apparatus by a time difference of said predetermined transmission delay time plus said predetermined receiver delay time.

12. A transmission apparatus comprising:
   signal source means for outputting audio/video data and synchronization signal;
   clock time generating means for generating a clock time;
   holding means for holding a clock time in response to said synchronization signal;
   transmission delay time generation means for generating a predetermined transmission delay time, said predetermined transmission delay time being a sum of a maximum packetizing time and a maximum arbitration delay time;
   adding means for adding said predetermined transmission delay time to the clock time held by the holding means and producing a timing information; and
   transmission means for transmitting said timing information together with the audio/video data.

13. A transmission apparatus comprising:
   signal source means for outputting audio/video data and synchronization signal;
   clock time generating means for generating a clock time;
   holding means for holding a clock time in response to said synchronization signal;
   transmission delay time generation means for generating a predetermined transmission delay time, said predetermined transmission delay time being a maximum packetizing time;
   adding means for adding said predetermined transmission delay time to the clock time held by the holding means and producing a timing information; and
   transmission means for transmitting said timing information together with the audio/video data.

14. A receiving apparatus for receiving audio/video data together with timing information from a transmission apparatus, said timing information being equal to a sum of a clock time of a synchronization signal as generated in the transmission apparatus and a predetermined transmission delay time, said receiving apparatus comprising:
   receiving means for receiving said audio/video data together with said timing information;
   clock time generating means for generating a clock time;
   first reference signal generating means for generating a first reference signal when said clock time matches with said timing information, said first reference signal generating means comprising a comparison means for comparing the clock time and said timing information;
   second reference signal generating means for generating a second reference signal having a predetermined frequency; and
   phase correction means for correcting the phase of said second reference signal to be in-phase with said first reference signal, whereby said second reference signal is time-difference synchronized with said video signal frame synchronization signal by a time difference of said predetermined transmission delay time.

15. A receiving apparatus for receiving audio/video data together with timing information from a transmission apparatus, said timing information being equal to a sum of a clock time of a synchronization signal as generated in the transmission apparatus and a predetermined transmission delay time, said receiving apparatus comprising:
   receiving means for receiving said audio/video data together with said timing information;
   clock time generating means for generating a clock time;
   first reference signal generating means for generating a first reference signal when said clock time matches with said timing information, said first reference signal generating means comprising:
   a receiver delay time generation means for generating a predetermined receiver delay time;
   adding means for adding said predetermined receiver delay time to said timing information and producing a sum signal; and
   comparison means for comparing the clock time and said sum signal, whereby said second reference signal is time-difference synchronized with said video signal frame synchronization signal by a time difference of said predetermined transmission delay time plus said predetermined receiver delay time;
   second reference signal generating means for generating a second reference signal having a predetermined frequency; and
   phase correction means for correcting the phase of said second reference signal to be in-phase with said first reference signal, whereby said second reference signal is time-difference synchronized with said video signal frame synchronization signal by a time difference of said predetermined transmission delay time.

* * * * *